(12) United States Patent
Gay et al.

(10) Patent No.: US 8,780,039 B2
(45) Date of Patent: *Jul. 15, 2014

(54) OPTICAL SYSTEM AND DISPLAY

(75) Inventors: Gregory Gay, Oxford (GB); Lesley Anne Parry-Jones, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 678 days.

This patent is subject to a terminal disclaimer.

(21) Appl. No.: 13/125,692

(22) PCT Filed: Nov. 11, 2009

(86) PCT No.: PCT/JP2009/069513
§ 371 (c)(1),
(2), (4) Date: Apr. 22, 2011

(87) PCT Pub. No.: WO2010/061755
PCT Pub. Date: Jun. 3, 2010

(65) Prior Publication Data
US 2011/0193814 A1    Aug. 11, 2011

(30) Foreign Application Priority Data
Nov. 28, 2008   (GB) .................................. 0821776.2

(51) Int. Cl.
G09G 3/34       (2006.01)
G02F 1/1335    (2006.01)

(52) U.S. Cl.
USPC ............................................ 345/108; 349/15

(58) Field of Classification Search
USPC ............................................ 345/108; 349/15
See application file for complete search history.

(56) References Cited

U.S. PATENT DOCUMENTS

| 5,515,122 | A  | 5/1996  | Morishima et al. |
| 6,075,651 | A  | 6/2000  | Hoppe |
| 6,094,242 | A  | 7/2000  | Yamanaka |
| 6,266,194 | B1 | 7/2001  | Tanijiri et al. |
| 6,271,969 | B1 | 8/2001  | Mertz |
| 6,304,303 | B1 | 10/2001 | Yamanaka |

(Continued)

FOREIGN PATENT DOCUMENTS

| EP | 0 632 303 A1 | 1/1995 |
| EP | 0 718 645 A2 | 6/1996 |

(Continued)

OTHER PUBLICATIONS

EP Search Report dated Jun. 8, 2011 for European Patent Application No. 08765219,4.

(Continued)

Primary Examiner — Jonathan Horner
(74) Attorney, Agent, or Firm — Nixon & Vanderhye P.C.

(57) ABSTRACT

An optical system is provided, for example for use with a display device, for varying the shape of a surface in which an image displayed by the display device is perceived. The optical system comprises first and second spaced-apart partial reflectors, at least one of which is switchable between a first non-flat shape and a second different shape, which may be flat or non-flat. The reflectors, together with polarisation optics, provide a light path such that light from the display is at least partially transmitted by the first reflector, partially reflected by the second reflector, partially reflected by the first reflector and partially transmitted by the second reflector. Light which does not follow the light path is prevented from leaving the optical system.

47 Claims, 34 Drawing Sheets

(56) References Cited

U.S. PATENT DOCUMENTS

| | | | |
|---|---|---|---|
| 6,469,683 | B1 | 10/2002 | Suyama et al. |
| 6,624,683 | B1 | 9/2003 | Bedarida et al. |
| 6,727,971 | B2 | 4/2004 | Lucas |
| 6,834,961 | B1 | 12/2004 | Cobb et al. |
| 6,869,183 | B2 | 3/2005 | Liang et al. |
| 6,906,860 | B2 | 6/2005 | Starkweather |
| 6,961,105 | B2 | 11/2005 | Chang et al. |
| 7,787,064 | B2 | 8/2010 | Kwon et al. |
| 8,493,520 | B2 * | 7/2013 | Gay et al. .......... 349/15 |
| 2002/0024743 | A1 | 2/2002 | Endo et al. |
| 2002/0047837 | A1 | 4/2002 | Suyama et al. |
| 2002/0131018 | A1 | 9/2002 | Lucas |
| 2004/0014504 | A1 | 1/2004 | Coates et al. |
| 2004/0160389 | A1 | 8/2004 | Suyama et al. |
| 2004/0164927 | A1 | 8/2004 | Suyama et al. |
| 2004/0239890 | A1 | 12/2004 | Starkweather |
| 2005/0111101 | A1 | 5/2005 | Dike |
| 2006/0098153 | A1 | 5/2006 | Slikkerveer et al. |
| 2007/0206302 | A1 * | 9/2007 | Furuichi et al. ........ 359/857 |
| 2009/0021818 | A1 * | 1/2009 | Weir et al. ............ 359/224 |
| 2009/0323024 | A1 | 12/2009 | Dike |
| 2009/0323313 | A1 * | 12/2009 | Choi et al. ............ 362/97.2 |
| 2010/0177113 | A1 | 7/2010 | Gay et al. |
| 2010/0238367 | A1 * | 9/2010 | Montgomery et al. ...... 349/15 |
| 2011/0193814 | A1 | 8/2011 | Gay et al. |

FOREIGN PATENT DOCUMENTS

| | | |
|---|---|---|
| EP | 0829744 | 3/1998 |
| EP | 0953962 | 11/1999 |
| GB | 2437553 | 10/2007 |
| GB | 2449682 | 12/2008 |
| JP | 7-84208 | 3/1995 |
| JP | 7-230058 A | 8/1995 |
| JP | 8-327940 | 12/1996 |
| JP | 10-74052 A | 3/1998 |
| JP | 11-153772 | 6/1999 |
| JP | 2000-180785 | 6/2000 |
| JP | 2004-533003 | 10/2004 |
| JP | 2007-517241 | 6/2007 |
| RU | 2 143 718 C1 | 12/1999 |
| WO | WO 94/11779 | 5/1994 |
| WO | WO 03/062872 | 7/2003 |
| WO | WO 2008/149961 | 12/2008 |

OTHER PUBLICATIONS

GB Search Report dated Sep. 4, 2007 for GB Application No. GB0710407.8.
International Search Report mailed Sep. 9, 2008 for PCT Application No. PCT/JP2008/060406.
Office Action mailed May 14, 2012 in U.S. Appl. No. 12/602,335.
Office Action mailed Sep. 4, 2012 in U.S. Appl. No. 12/602,335.
Office Action mailed Jan. 7, 2013 in U.S. Appl. No. 12/602,335.
Yeh et al, "Optics of Liquid Crystal Displays", Wiley Series in Pure and Applied Optics, 1999.
International Search Report for PCT/JP2009/069513, mailed Mar. 2, 2010.
Written Opinion of the International Searching Authority for PCT/JP2009/069513, mailed Mar. 2, 2010.
UK Search Report for UK Application No. GB0821776.2, dated Mar. 27, 2009.
Pons, Jose, "Emerging Actuator Technologies: A Mecha-Tronic Approach", pp. 39-45, pp. 67-68, pp. 101-109, and pp. 145-159.
Shahinpoor, M. et al., "Ionic Polymer-Metal Composites (IPMC) As Biomimetic Sensors and Actuators", Proceedings of SPIE's $5^{th}$ Annual International Symposium on Smart Structures and Materials, (Mar. 1-5, 1998), Paper No. 3324-27.
Pelesko, J.A. et al., "Modeling MEMS and NEMS", Chapman & Hall/CRC, pp. 91-98, pp. 177-186.
Lueder, E. et al., "Liquid Crystal Displays: Addressing Schemes and Electro-optic Effects", Wiley—SID Series in Display Technology, (2001), pp. 119-121, pp. 128-136, and pp. 145-152.
Hecht, E. et al., Optics Fourth Edition, (2003), pp. 37-39 and pp. 366-368.

* cited by examiner

F I G. 2
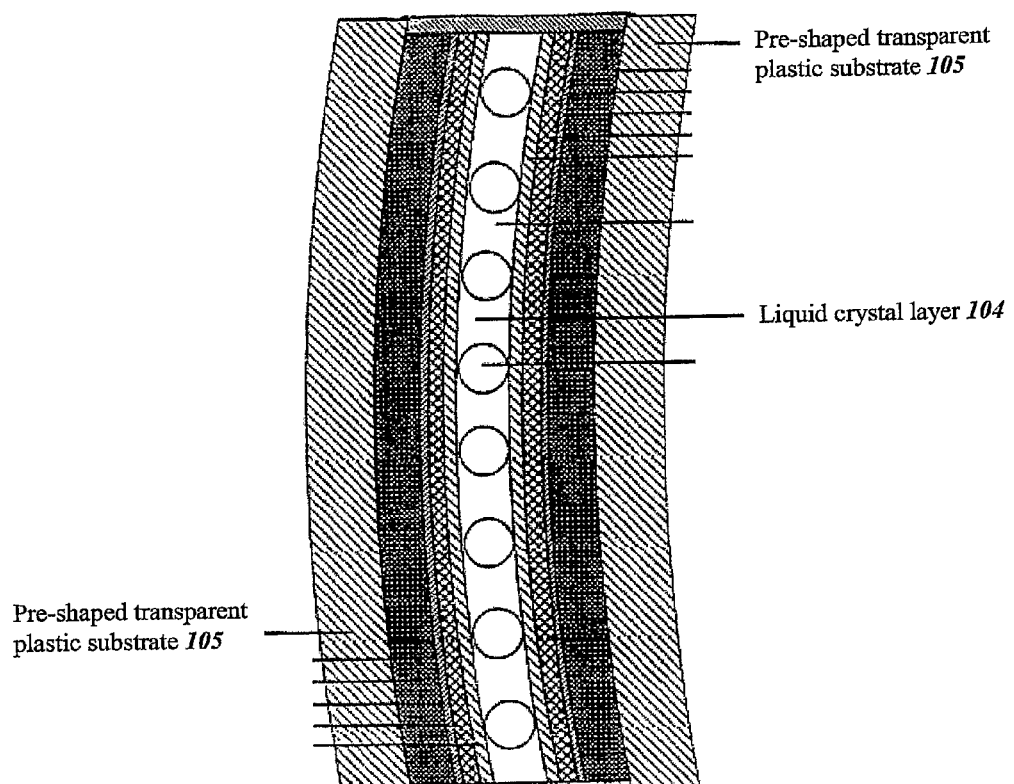
(Prior Art)

(Prior Art)

(Prior Art)

(Prior Art)

(Prior Art)

*Dual-depth display in no-depth mode*

(Prior Art)

(Prior Art)

(Prior Art)

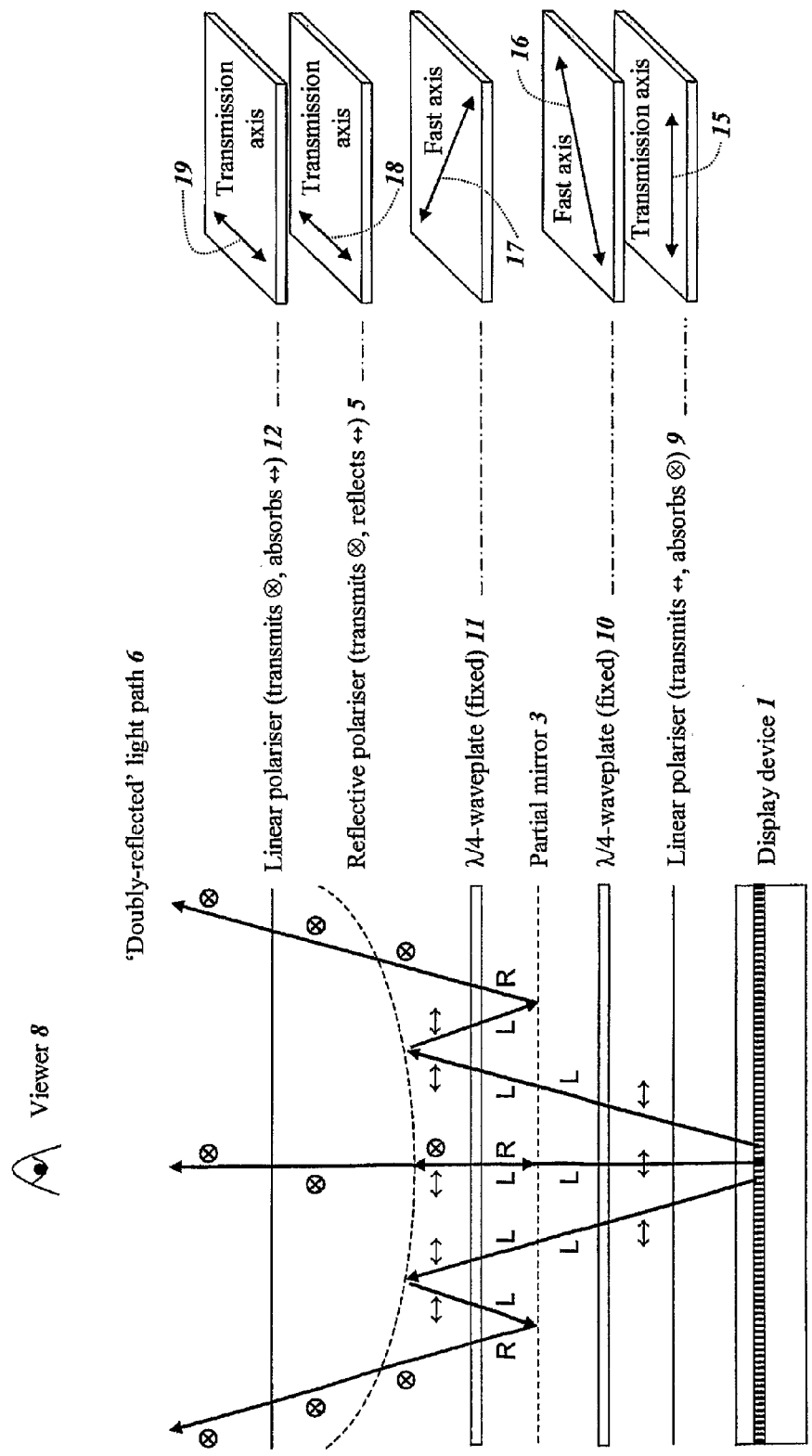

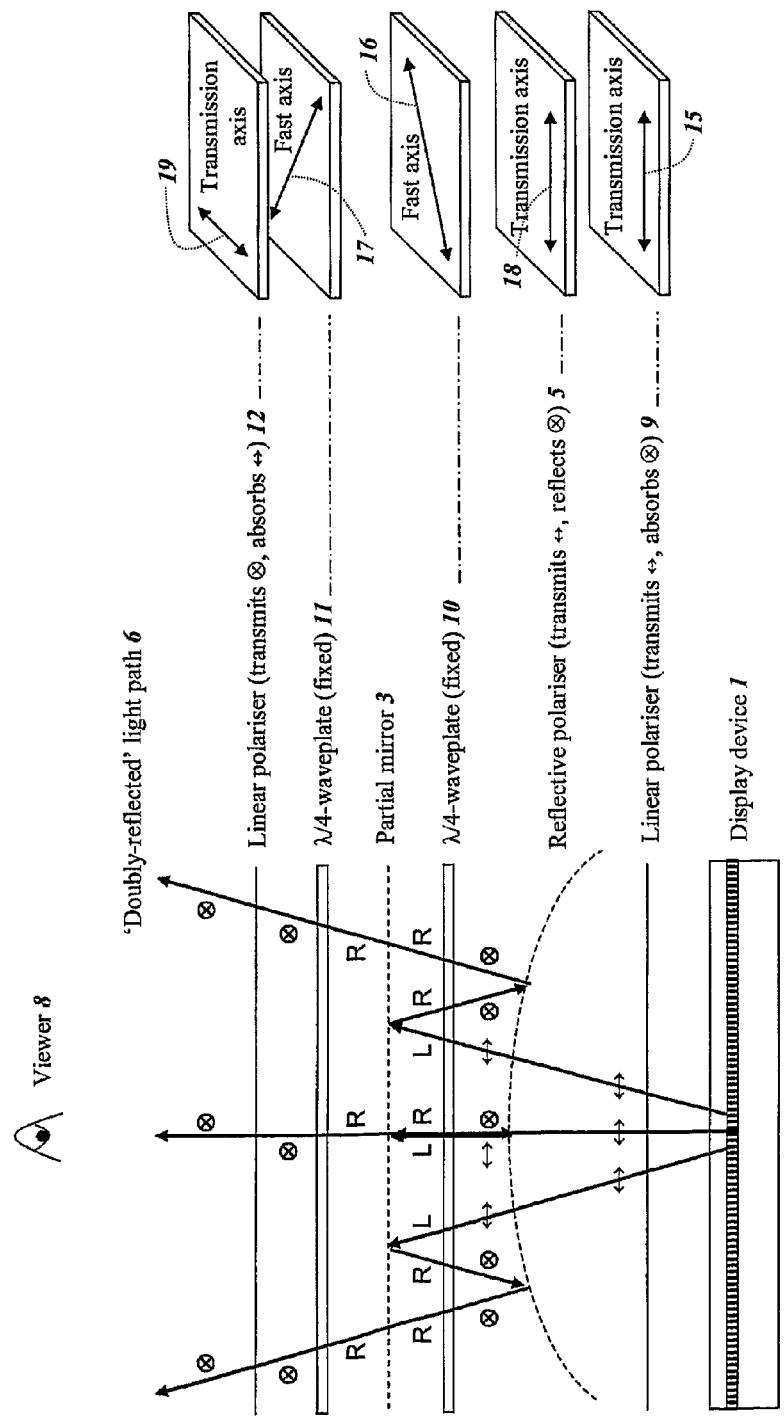

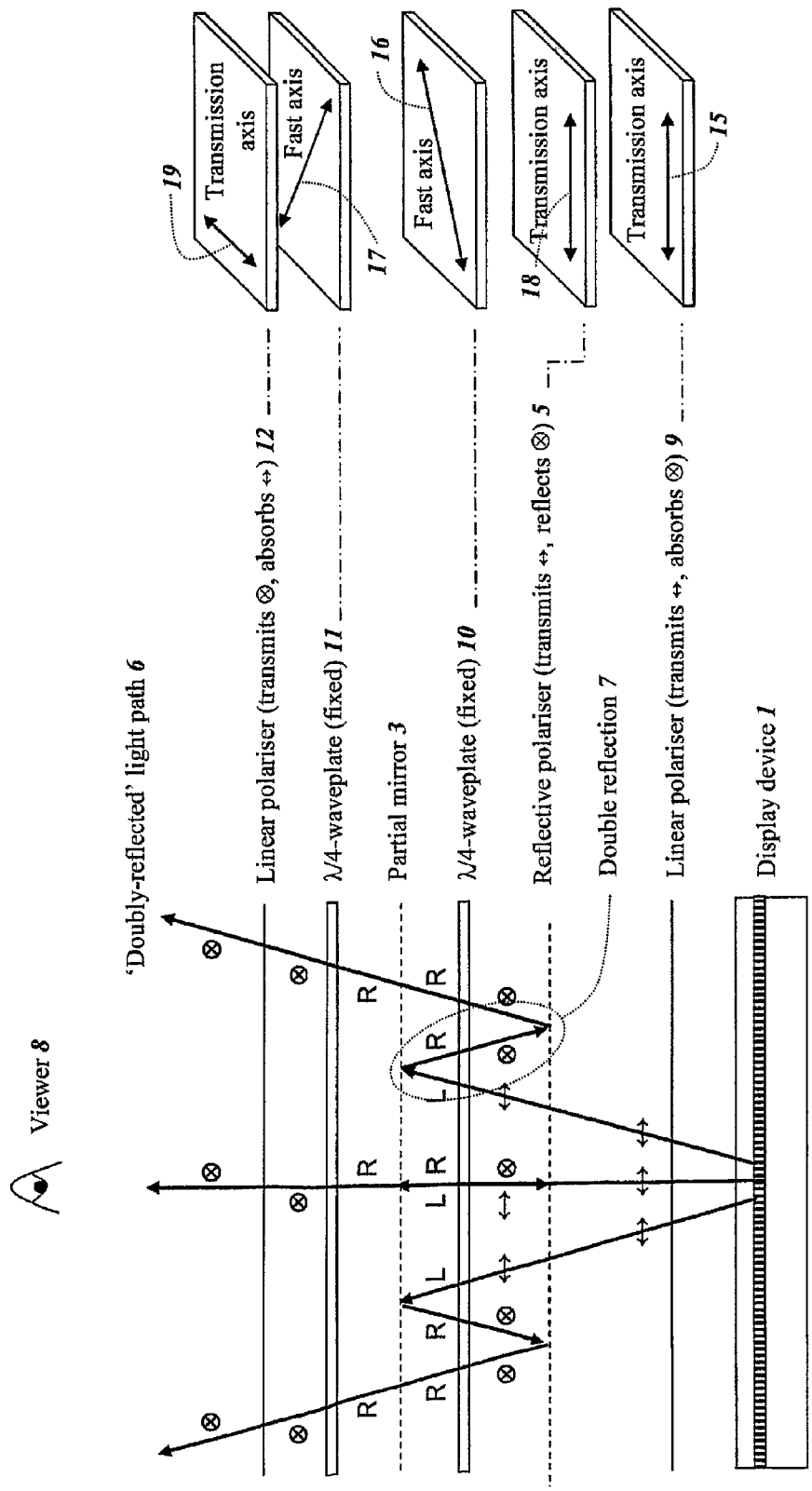

FIG. 16c
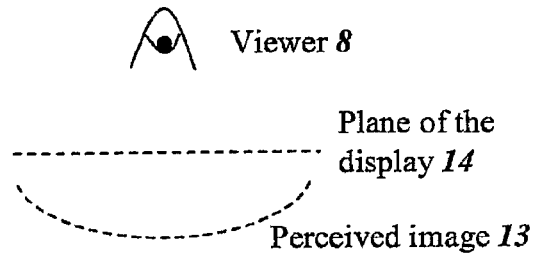
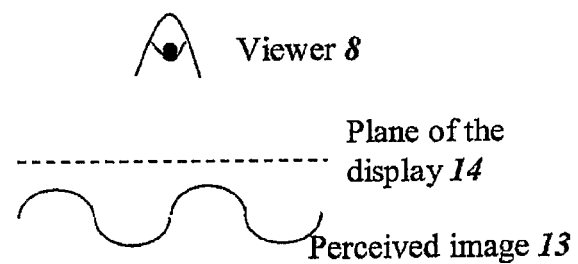
FIG. 17a
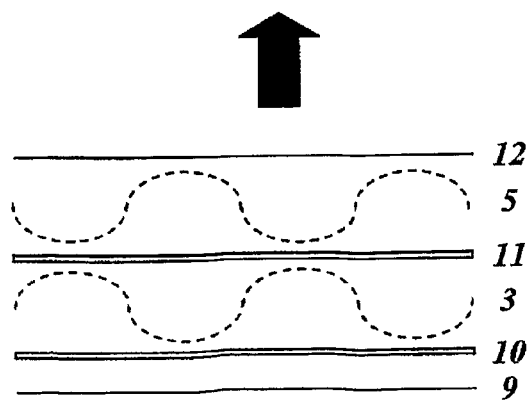

F I G. 1 7 b
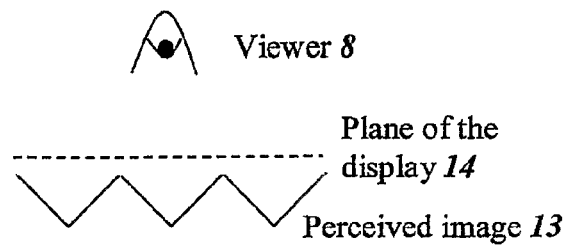
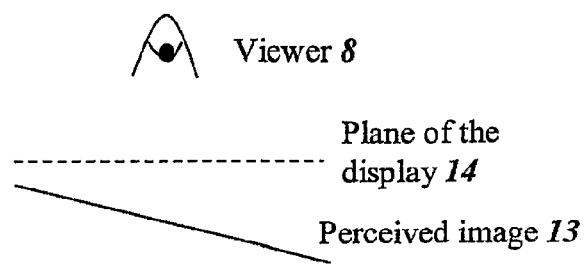
F I G. 1 7 c
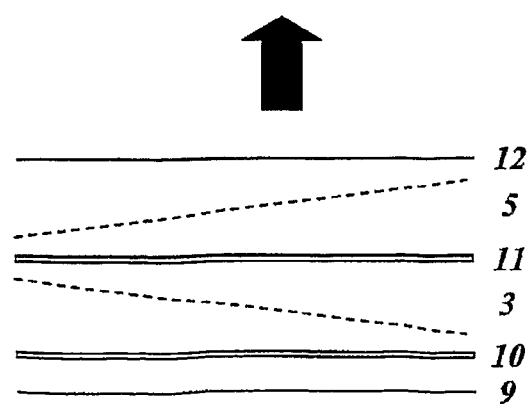

FIG. 18a
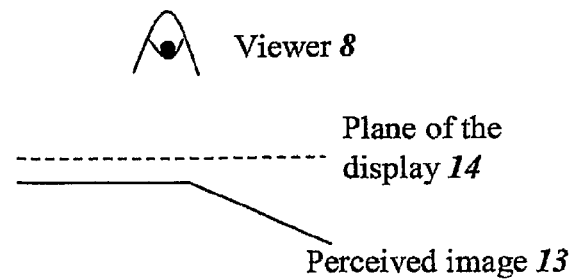
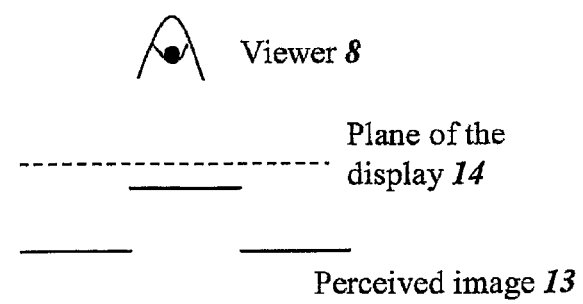
FIG. 18b
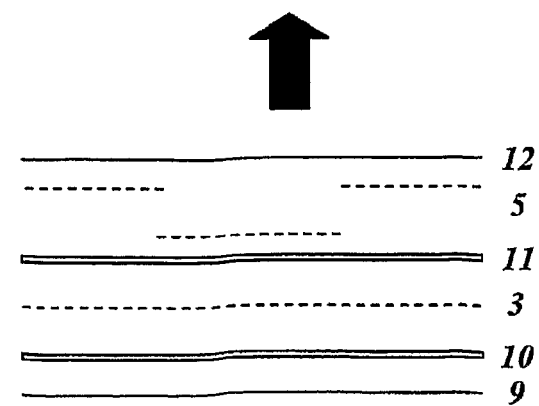

F I G. 1 8 c
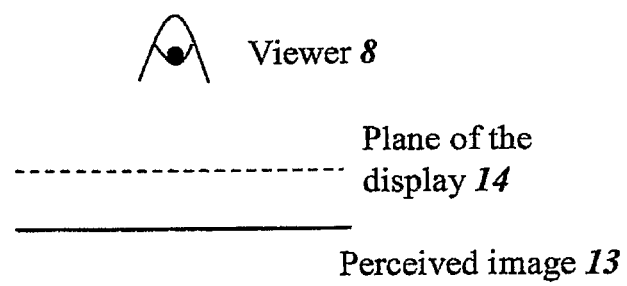
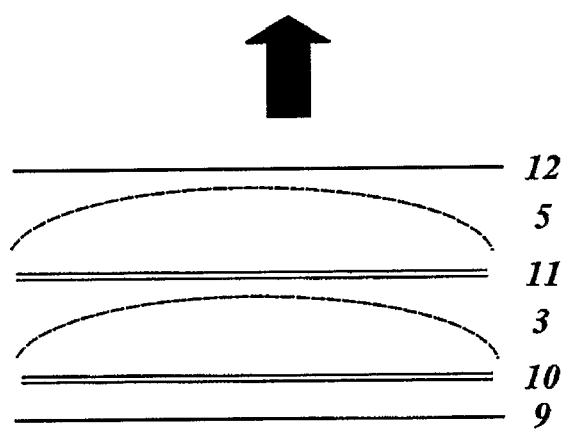

F I G. 2 8 a
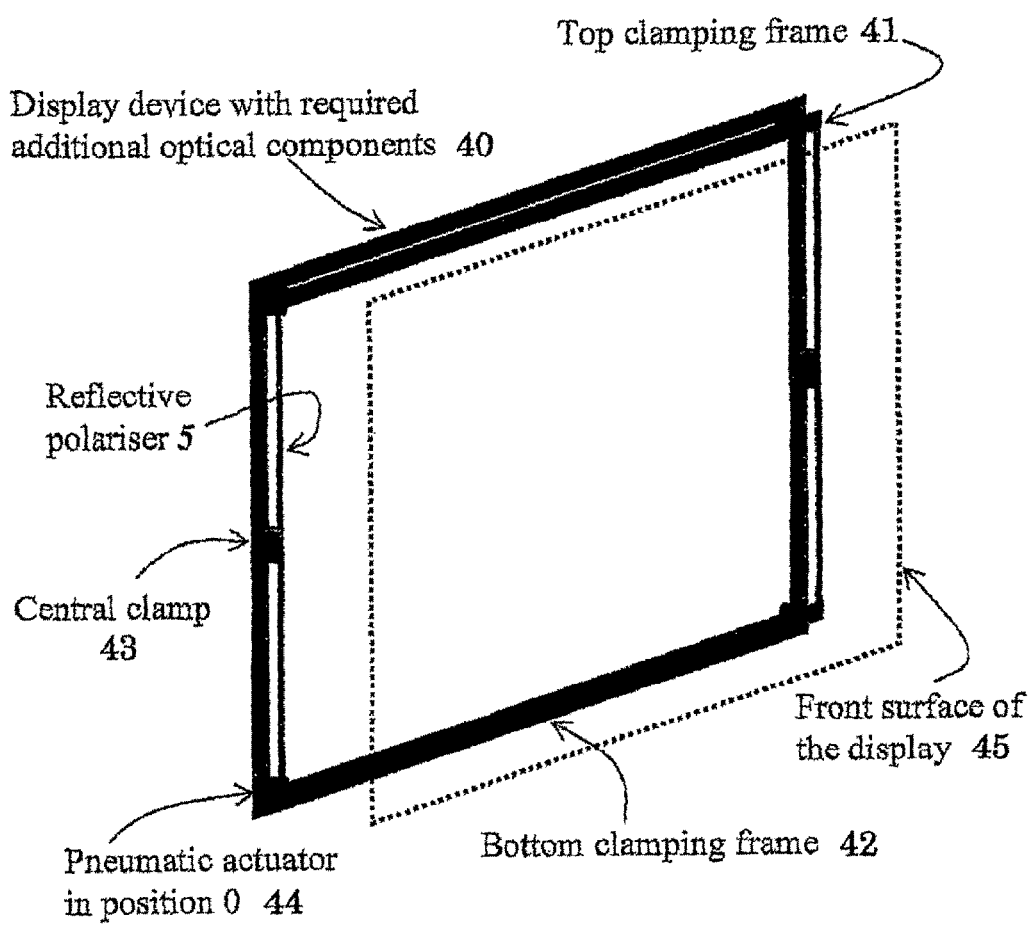

F I G. 2 8 b
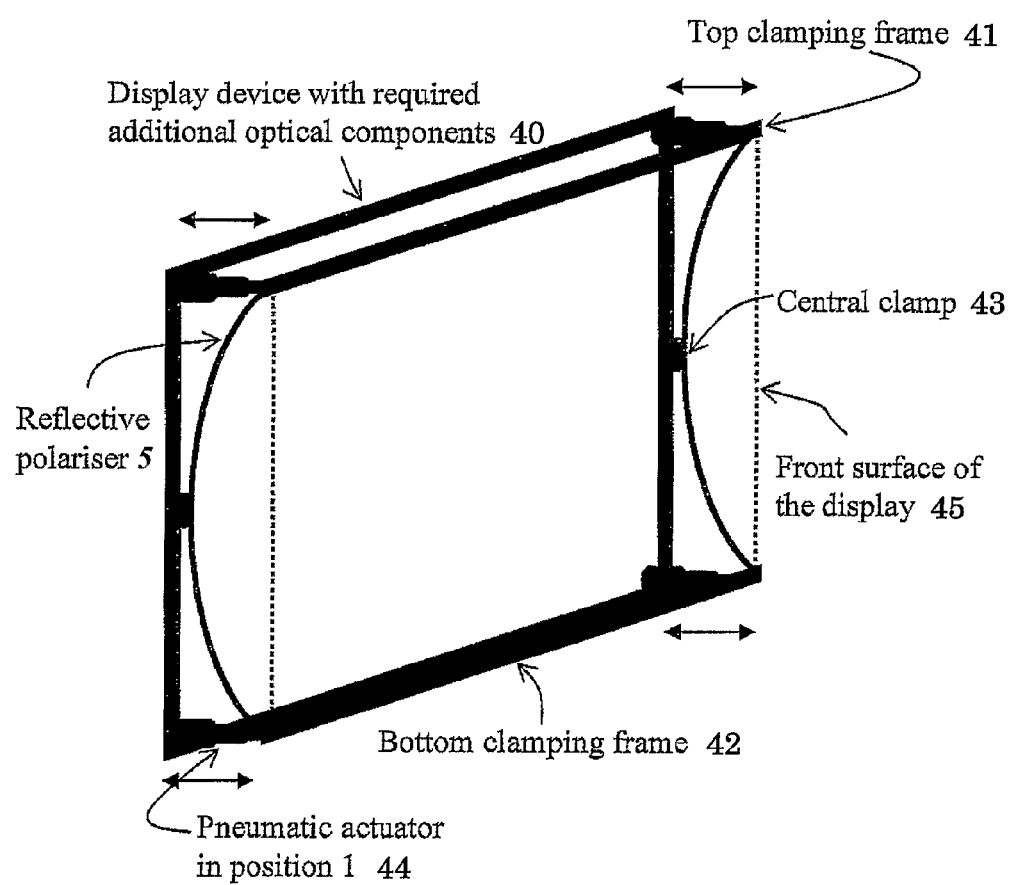

OPTICAL SYSTEM AND DISPLAY

This application is the U.S. national phase of International Application No. PCT/JP2009/069513, filed 11 Nov. 2009; which designated the U.S. and claims priority to UK Application No. 0821776.2, filed 28 Nov. 2008, the entire contents of each of which are hereby incorporated by reference.

TECHNICAL FIELD

The present invention relates to an optical system for modifying the appearance of an image, for example for converting a flat image to a non-flat image or a non-flat image to a different non-flat image. The present invention also relates to a display for producing a non-flat image. Such a display may be used, for example, to provide a curved appearance to the displayed image. Such a display may, for example, be used in information display applications including automotive (for example as an instrument display), advertising, television, games or other amusement applications, immersive display applications and in any applications where enhanced aesthetics may be desirable to the user.

BACKGROUND ART

It is known for vehicles, such as automobiles and aircraft, to include an electronic display providing an image of, for example, an instrument cluster for replacing discrete mechanical or electrical dials. However, such displays are generally aesthetically limited because of their inability to produce images that differ from the standard two dimensional (2D) images displayed in the plane of the display. In addition to reducing the aesthetics of such displays, the inability to produce images that do not appear flat may provide limited realism of such displays. Although stereoscopic and autostereoscopic displays are known and can produce an impression of a three-dimensional image, such displays may produce eye strain and headache problems because of a potential limited freedom of viewing position and focussing issues.

It is also known for advertising displays, for example large-area public displays in shopping centres and digital signage displays on motorways, to aim to catch maximum attention. Although such displays are becoming more and more common, they generally do not include any aesthetically appealing features, aside from their large size, that would make them stand out of the ordinary and facilitate their acceptance. Overcoming the inability of such displays to produce images different from standard flat 2D images displayed in the plane of the display may therefore contribute towards their widespread acceptance.

It is also known for amusement devices, for example Pachinko machines, to include an electronic display in the centre of its layout providing, for example, movies, animations or a digital slot machine. Although such amusement devices show more and more attractive features with mechanical moving parts and abundant flashing lights, they are generally limited to a display which is unable to produce appealing images that differ from standard flat 2D images displayed in the plane of the display. Overcoming this issue by also making the display stand out of the ordinary may therefore contribute to increase enthusiasm and entertainment of players.

A first general class of prior art teaches how to make stereoscopic and auto-stereoscopic displays from a single panel. For example, FIG. 1 of the accompanying drawings illustrates a switchable 2D/3D (two dimensional/three dimensional) display based on the use of a parallax barrier, as disclosed in EP0829744 (18 Mar. 1998, MOSELEY Richard Robert; WOODGATE Graham John; JACOBS Adrian; HARROLD Jonathan; EZRA David). The parallax barrier comprises a polarisation-modifying layer 100, with alternating aperture regions 101 and barrier regions 102, and a polariser in the form of a polarisation sheet 103 which may be disabled. The parallax element provides the possibility of operating the display in a wide view full resolution 2D-mode or in a directional 3D autostereoscopic mode. However, this device produces a stereo image pair to generate 3D images rather than images with curved-appearance. Drawbacks of auto-stereoscopic displays include limited head freedom and inconsistency between 3D perception from stereo and from other cues (head motion, focus), leading to user confusion and sometimes eye strain and headaches.

A second general class of prior art is related to curved or conformal displays. For example, FIG. 2 of the accompanying drawings shows a display of the type disclosed in WO94/11779 (26 May 1994, GROSS Hyman Abraham Moses; ARTLEY Richard John; CLARK Michael George; HAYTHORNTHWAITE Arthur; WILKINSON Peter; WALLIS Miles). A curved liquid crystal display is manufactured by sandwiching a liquid crystal layer 104 between two curved pre-shaped transparent plastic substrates 105 or between two flexible substrates.

As illustrated in FIG. 3 of the accompanying drawings, US2006/0098153A1 (11 May 2006, SLIKKERVEER Peter J; BOUTEN Petrus Cornelis P; CIRKEL Peter A) discloses a display of the same type but where a curved display is formed by manufacturing a flat panel display layer 106 and thereafter curving the display layer itself by adhering an additional film 107 to it. The additional film may for example have been pre-stretched and the contraction force it releases after adhesion to the display results in the bending of the display.

Like flexible displays, although these curved displays are able to generate curved images, they all rely on displays which have been physically bent in order to produce the desired curvature. Such curved displays have many disadvantages, such as very high cost, limitations in material efficiency and material diversity, and strong difficulty in manufacturing. Further, displays of this type are very limited in their design as the variety of feasible curved-shapes is limited and, once a display has been manufactured with a specific curvature, this cannot be changed. Also, curved displays are not ready for mass-production yet as each production line would need to adapt to a particular curved design.

A third class of prior art concerns displays using projection onto curved surfaces. For example, U.S. Pat. No. 6,727,971 (27 Apr. 2004, LUCAS Walter A) and U.S. Pat. No. 6,906,860 (14 Jun. 2005, STARKWEATHER Gary K), disclose a display of the type illustrated in FIGS. 4a and 4b, respectively, of the accompanying drawings. In both cases, the display comprises at least one projector 108 and a curved screen 109, onto which is projected an image.

Such displays are well-known from the public area and are used for many applications such as the reconfigurable display from Digital Dash or immersive displays. However, they have the disadvantage of requiring a large space and being limited to projection technology only. Also, they are generally defined as constituting a display when considering together the projection system associated with the curved screen and not the projection system by itself.

A final class of prior art is related to head-mounted display applications. Displays for such applications usually use an optical system carefully designed to focus light from a display into the retina of an observer by means of as compact a device as possible.

For example, FIG. 5 of the accompanying drawings illustrates a display used for a head-mounted display, as disclosed in U.S. Pat. No. 6,304,303 (16 Oct. 2001, YAMANAKA Atsushi). The display uses folded optical path technology with two reflective surfaces 110 and 111 in order to reduce size and weight of the display and widen its angle of visibility. However, such a display aims to provide a high-quality image without curvature.

As shown in FIG. 6 of the accompanying drawings, U.S. Pat. No. 5,515,122 (7 May 1996, MORISHIMA Hideki; MATSUMURA Susumu; TANIGUCHI Naosato; YOSHINAGA Yoko; KOBAYASHI Shin; SUDO Toshiyuki; KANEKO Tadashi; NANBA Norihiro; AKIYAMA Takeshi) discloses a display of the same type but where, by use of a very different technology based on a lens system 112 combined with reflective layers 113 and 114, a virtual curved image 115 is generated in order to enhance presence and realism of the image to the observer.

GB2437553 (31 Oct. 2007, EVANS Allan; CURD Alistair Paul; WYNNE-POWELL Thomas Matthew) discloses a family of dual- and multiple-depth displays where a multiple-depth image is generated from a single display panel. Optical elements are placed a short distance in front of a display panel to produce differing depth effects from different optical paths. By use of polarisation effects and partial reflections, different images are associated with light paths of different lengths and appear to originate from different planes. By displaying these images time-sequentially or spatially-interlaced, a multiple-depth effect is achieved.

An embodiment from GB2437553 is shown in FIGS. 7a and 7b of the accompanying drawings. First and second partial reflectors 115 and 116 are placed in front of a liquid crystal display (LCD) panel 114 with polarisation-modifying optics 117 disposed between the first and second partial reflectors 115 and 116. The first and second partial reflectors 115 and 116 are separated from each other by an appropriate spacing for producing a depth-shifted image. Light from two different images displayed by the LCD panel 114 travels along different light paths towards the viewer. Light encoding the first image passes directly by transmission through the optical system to the viewing region as shown in FIG. 7b, whereas light encoding the second image follows a folded optical path 118 before reaching the viewer as shown in FIG. 7a. As a result of the different lengths of the different paths 118 and 119, the first image appears at the location of the LCD 114, whereas the second image 120 of the LCD is shifted in depth so as to appear below the LCD. The viewer thus observes images in different depth planes.

Displays of this type have clear advantages over multiple-depth displays using multiple display panels, for example in terms of cost, brightness and volume. However, the main purpose of these displays is to create two or more images, separated in depth. In addition, the partial reflectors in the optical system of such displays are parallel to each other and to an image surface of the display.

When two images must be presented independently to a viewer from the same underlying display, there is some leakage or crosstalk between the views and this may be corrected by modifying the image data sent to the display. Crosstalk can be effectively removed, but there is also a loss of contrast.

EP0953962 (3 Nov. 1999, JONES Graham; HOLLIMAN Nicolas) discloses crosstalk correction in 3D and dual-view displays. For these two types of display, crosstalk tends to be symmetric and colour-independent. In other words, the leakage from image 1 to image 2 is the same as the leakage from image 2 to image 1, and also the same for red, green and blue components of the image.

GB2437553 discloses the same basic principle of crosstalk correction but applied to dual-depth displays. For this type of display, crosstalk tends to depend upon which plane leakage is originating from, as well as on colour.

GB2449682 (3 Dec. 2008, GAY Gregory; WALTON Harry Garth) describes an optical system for converting a standard flat image to a non-flat image. It uses a folded optical light path technology based on reflective layers 121, 122, at least one of which is curved, and an additional uniform switchable LC cell to provide electrical switching between a standard flat image mode and a non-flat image mode. An embodiment from GB2449682 is shown in FIGS. 8a and 8b of the accompanying drawings. When the additional switchable half-wave plate 123 is switched off, light passes directly by transmission through the optical system to the viewing region as illustrated in FIG. 8a. When the additional switchable half-wave plate 123 is switched on, light follows a doubly-reflected light path 124 as shown in FIG. 8b. Because of the doubly-reflected light path 124 and of the curved-shape given to the reflective polariser 122, the optical light path is longer towards the edge of the display and the display image is observed with a curved appearance 125.

Displays of this type can provide a non-flat image from a conventional flat display with the capacity of switching electrically between a standard 2D-mode and a curved-appearance mode. However, the additional LC cell required for the switching adds extra cost and deteriorates image quality of the display by increasing crosstalk in both image modes. In addition, because the reflective films are fixed in place, image curvature displayed in the curved-appearance mode has to be decided at the manufacturing step and will be fixed thereafter.

SUMMARY OF INVENTION

Any element of the system described hereinafter as "flat" means that it is planar and parallel to the display device. Any other alternative, for example, planar but tilted relative to the display device or partly or continuously curved in one or more directions, will be referred to hereinafter as "non-flat".

According to a first aspect of the invention, there is provided an optical system for varying the shape of a surface in which an image is perceived, the optical system comprising first and second spaced-apart partial reflectors, at least one of which is selectively switchable between a non-flat first shape and at least one second shape different from the first shape, and providing a light path for light incident on the first reflector, the first light path comprising at least partial transmission through the first reflector towards the second reflector, at least partial reflection from the second reflector back towards the first reflector, at least partial reflection from the first reflector towards the second reflector, and at least partial transmission through the second reflector.

The optical system may be arranged substantially to prevent emission from the second reflector of light not reflected during reflection by the first and second reflectors, wherein light incident on the second partial reflector for the first time does not leave the optical system.

Keeping the light path unchanged but modifying its optical length in different positions by varying the shape of at least one of the partial reflectors, the optical system may be switchable between a flat image mode and a non-flat image mode or between a non-flat image mode and a different non-flat image mode.

The second shape may be flat. As an alternative, the second shape may be non-flat.

The at least one of the first and second reflectors which is selectively switchable may comprise one of the first and second reflectors and the other of the first and second reflectors may be of fixed shape. The fixed shape may be flat. As an alternative, the fixed shape may be non-flat.

The other of the first and second reflectors may be selectively switchable between a non-flat third shape and a fourth shape different from the third shape. The fourth shape may be flat. As an alternative, the fourth shape may be non-flat. The third shape may be a mirror image of the first shape. The fourth shape may be a mirror image of the second shape.

The first and/or third shape may be continuously curved in at least one direction for producing a concave or convex image.

The first and/or third shape may be partly curved in at least one direction.

The first and/or third shape may have a serpentine cross-section.

The first and/or third shape may comprise a plurality of flat segments, adjacent ones of which abut each other along an edge and subtend an angle greater than 0° and less than 180°.

The first and/or third shape may be planar but tilted in at least one direction.

The first and/or third shape may have flat and non-flat regions.

The first and/or third shape may comprise a plurality of flat and/or non-flat regions which are non-coplanar.

The first and third shapes may be of at least similar shape and everywhere parallel to each other.

The optical system may be arranged to change the polarisation of light during passage along the light path. The optical system may be arranged to change the polarisation of light during passage along the light path between incidence on the second partial reflector and reflection from the first partial reflector.

The system may include a lens arrangement for at least partially correcting for image distortion.

The system may comprise at least one quarter wave plate. The quarter wave plate or a second of the quarter wave plates may be disposed between the first and second partial reflectors. The quarter wave plate or a first of the quarter wave plates may be disposed on a side of the first partial reflector opposite the second partial reflector.

The first partial reflector may comprise a first partial mirror. The first partial mirror may comprise a patterned mirror. The first partial mirror may comprise a patterned mirror associated with an array of converging lenses. The quarter wave plate or the second of the quarter wave plates and the patterned mirror may form an integrated cell. The quarter wave plate or the second of the quarter wave plates may be patterned and may have retarding portions disposed on reflective regions of the patterned mirror and non-retarding portions disposed on transparent regions of the patterned mirror.

The first partial reflector may comprise a first reflective polariser.

The second partial reflector may comprise a second reflective polariser. The second reflective polariser may comprise a cholesteric reflector. The second reflective polariser may be non-flat and the system may comprise a first prism film arranged to redirect light from the first partial reflector to be incident substantially normally on the second reflective polariser. The system may comprise a second prism film arranged to redirect light from the second reflective polariser to the direction of light incident on the first prism film.

The second partial reflector may comprise a second partial mirror.

The system may comprise a Faraday rotator. The Faraday rotator may be arranged to provide 45° of polarisation rotation.

The system may comprise an input linear polariser.

The system may comprise an output linear polariser.

According to a second aspect of the invention, there is provided a display comprising: a display device for modulating light with an image or sequence of images at an image display surface of the device; and an optical system according to the first aspect of the invention, the first partial reflector being disposed between the device and the second partial reflector.

The display device may comprise one of a liquid crystal device, a projection display device, an organic light emitting diode device, a plasma light emitting device and a cathode ray tube.

The display may comprise at least one of an (for example automotive) instrument display, an advertising display, an immersive display, an amusement display, a television display or any other display where enhanced aesthetic and added realism may be desirable to the user.

The display may comprise an image processor for remapping image pixels to correct at least partially for image distortion by the or each non-flat one of the first and second reflectors.

The display may comprise an image processor for remapping colour channels of image pixels to correct at least partially for light exiting the optical system along an unintended light path.

The display may comprise an image processor for manipulating grey levels of image pixels to increase at least partially the apparent brightness of at least part of the image.

The optical system may comprise a removable attachment attached to the device.

The display may include a touch panel.

It is thus possible to provide an arrangement which allows the shape of a "surface" in which an image is perceived to be changed. For example, a conventional or unmodified display device may be used and the flat or substantially flat image produced by such a device can be converted into a non-flat image, for instance a curved image or a tilted image. This non-flat image may be further modified to produce a different non-flat image or a flat image.

It is also possible to provide an arrangement which allows a flat image to be created in a relatively simple way from a non-flat image. For example, a flexible or curved display device may be used and the non-flat image produced by such a device can be converted into a flat image, which may further be modified to a non-flat image.

This may be achieved with commonly available and relatively low cost optical elements. Viewing freedom and image resolution may be the same or substantially the same as for the basic display device. An aesthetically desirable or more striking appearance may thus be provided.

The foregoing and other objectives, features, and advantages of the invention will be more readily understood upon consideration of the following detailed description of the invention, taken in conjunction with the accompanying drawings.

BRIEF DESCRIPTION OF DRAWINGS

FIG. 2 is a diagram illustrating a known type of curved display;

FIGS. 11a and 11b are diagrams illustrating the structure and operation of the display as shown in FIG. 10a;

FIGS. 13a and 13b are diagrams illustrating a modified structure and operation of another example of the first embodiment of the invention as shown in FIG. 10a;

FIGS. 14a and 14b are diagrams illustrating a modified structure and operation of another example of the first embodiment of the invention as shown in FIG. 10b;

FIGS. 16a to 16c are diagrams illustrating conventional examples of reflector shapes for use in embodiments of the invention;

FIGS. 17a to 17c are diagrams illustrating more complex examples of reflector shapes for use in embodiments of the invention;

FIGS. 18a to 18c are diagrams illustrating other examples of reflector shapes for use in embodiments of the invention;

FIGS. 28a and 28b are diagrams illustrating a switchable reflector in its flat and non-flat states, respectively.

Like reference numerals and characters refer to like parts throughout the drawings.

DESCRIPTION OF EMBODIMENTS

Figure 1:
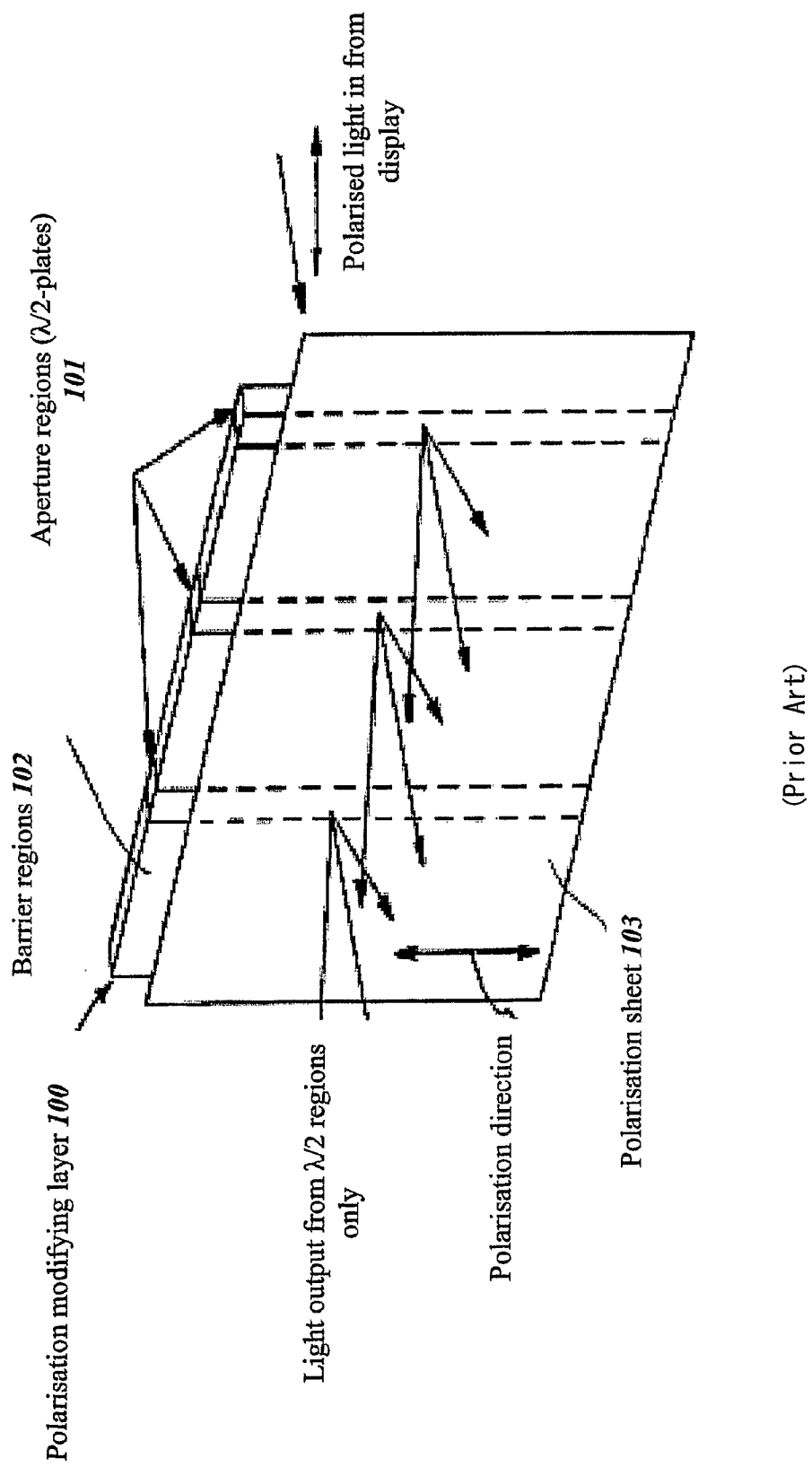
FIG. 1 is a diagram illustrating a known technique for creating an autostereoscopic display switchable between a 2D-mode and a 3D-mode.
Figure 3:
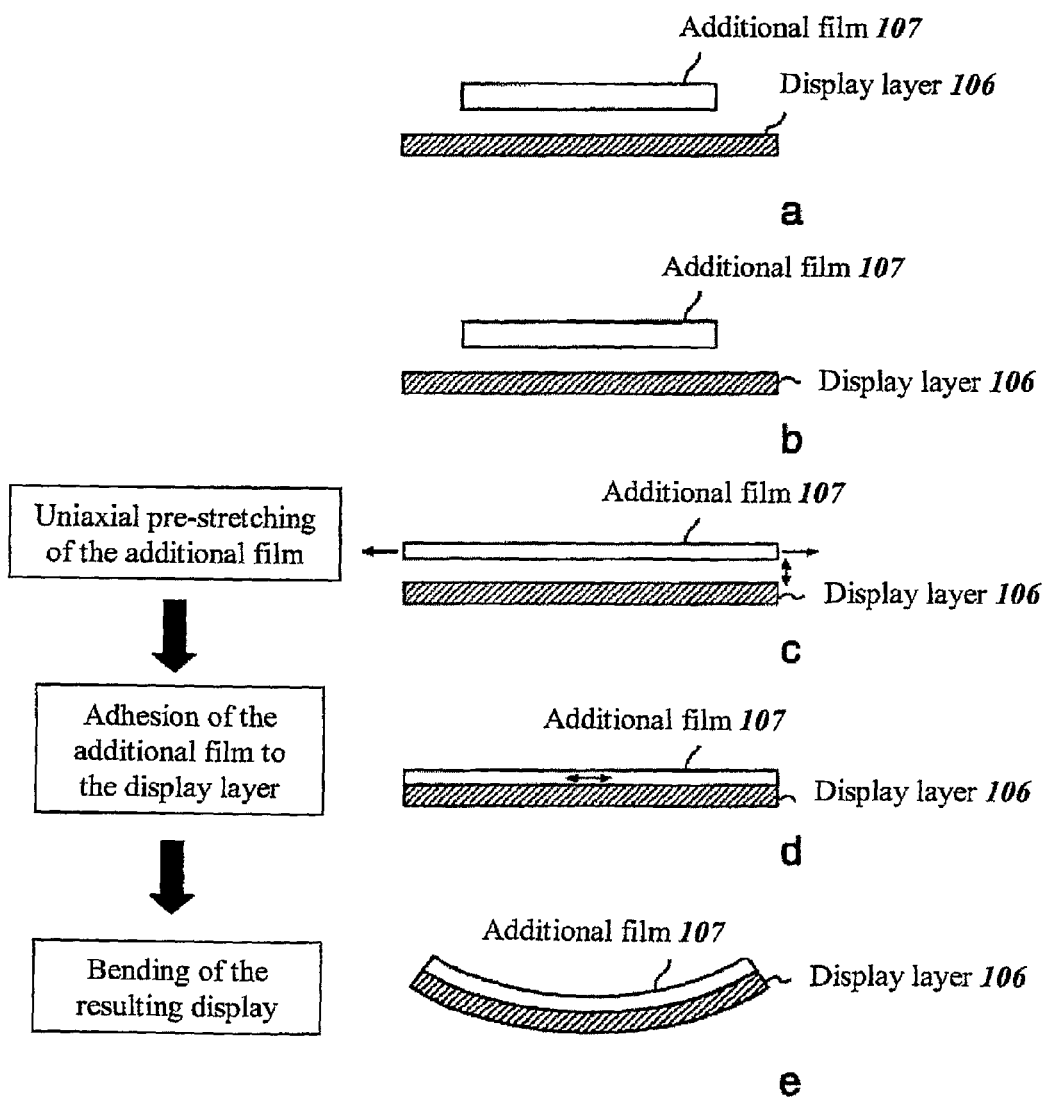
FIG. 3 is a diagram illustrating a known method for creating a curved display.
Figure 4A:
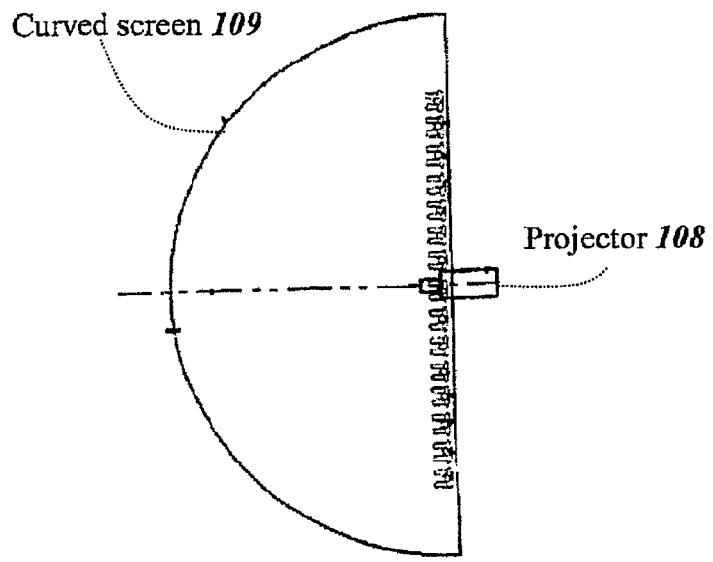
FIGS. 4a and 4b are diagrams illustrating known types of displays using projection onto curved surfaces.
Figure 4B:
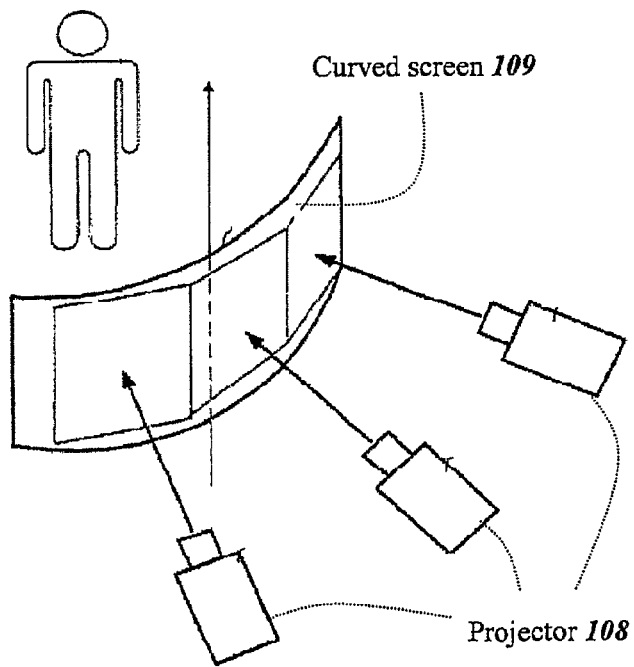
Figure 5:
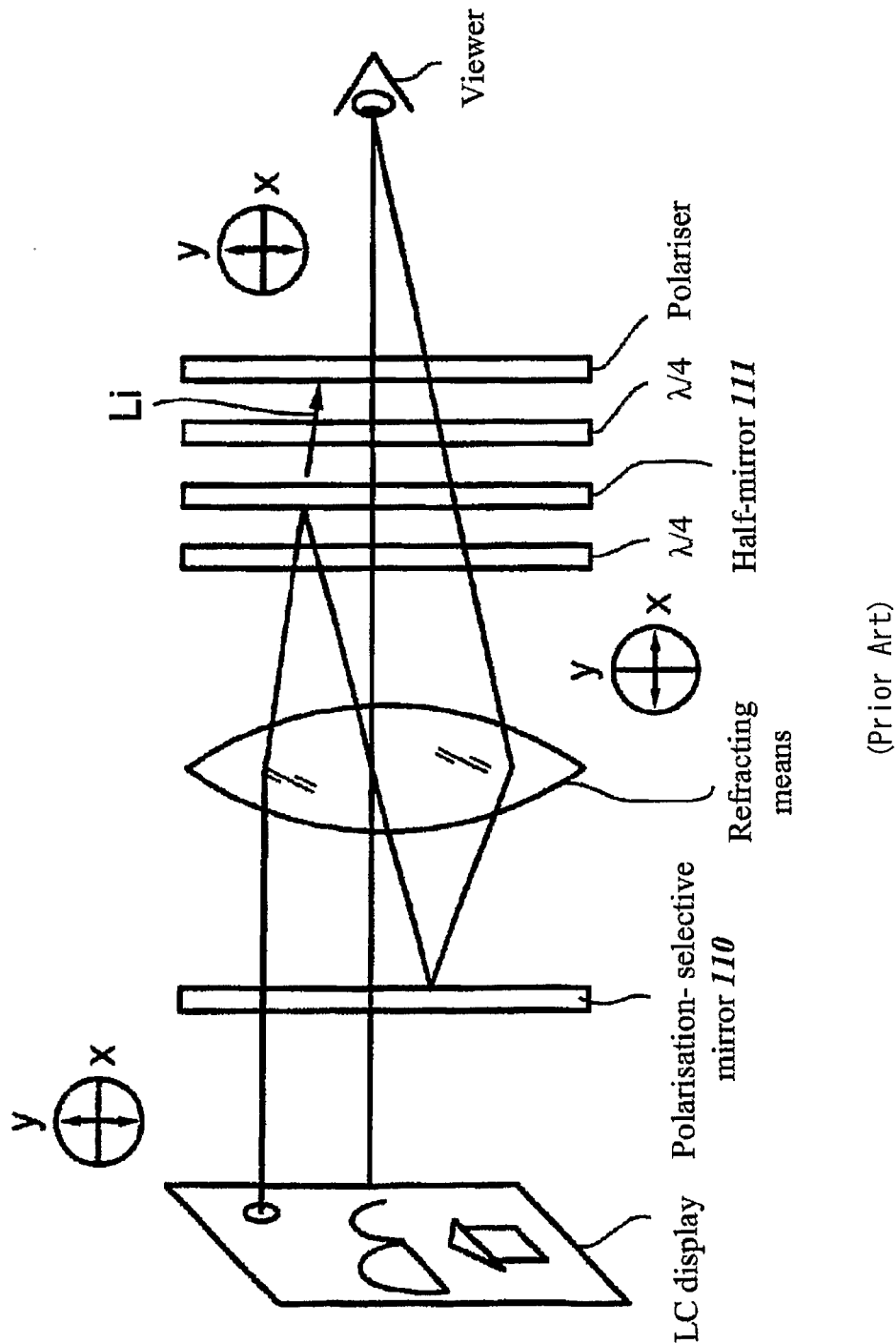
FIG. 5 is a diagram illustrating a known type of head-up display.
Figure 6:
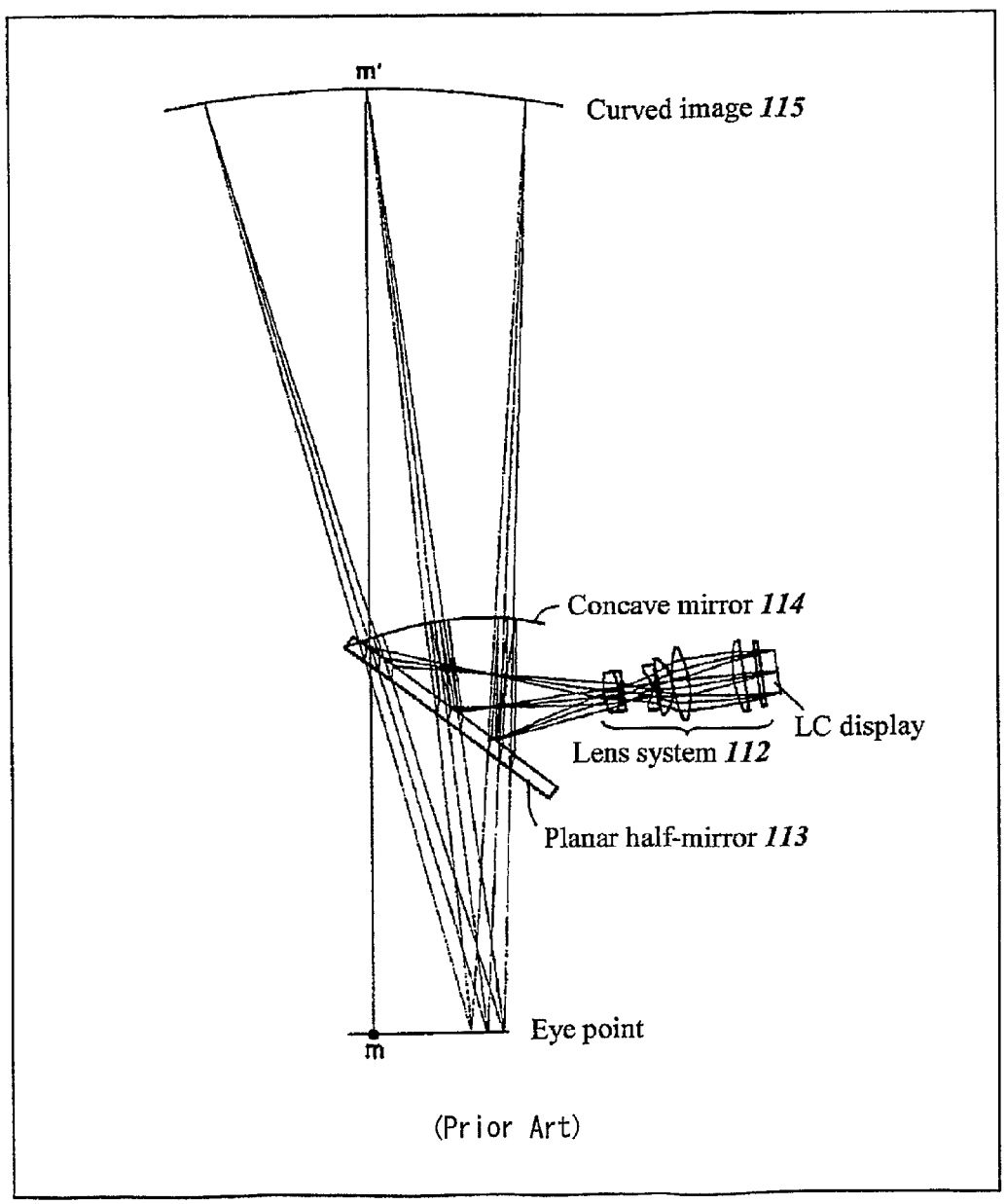
FIG. 6 is a diagram illustrating another known type of head-up display.
Figure 7A:
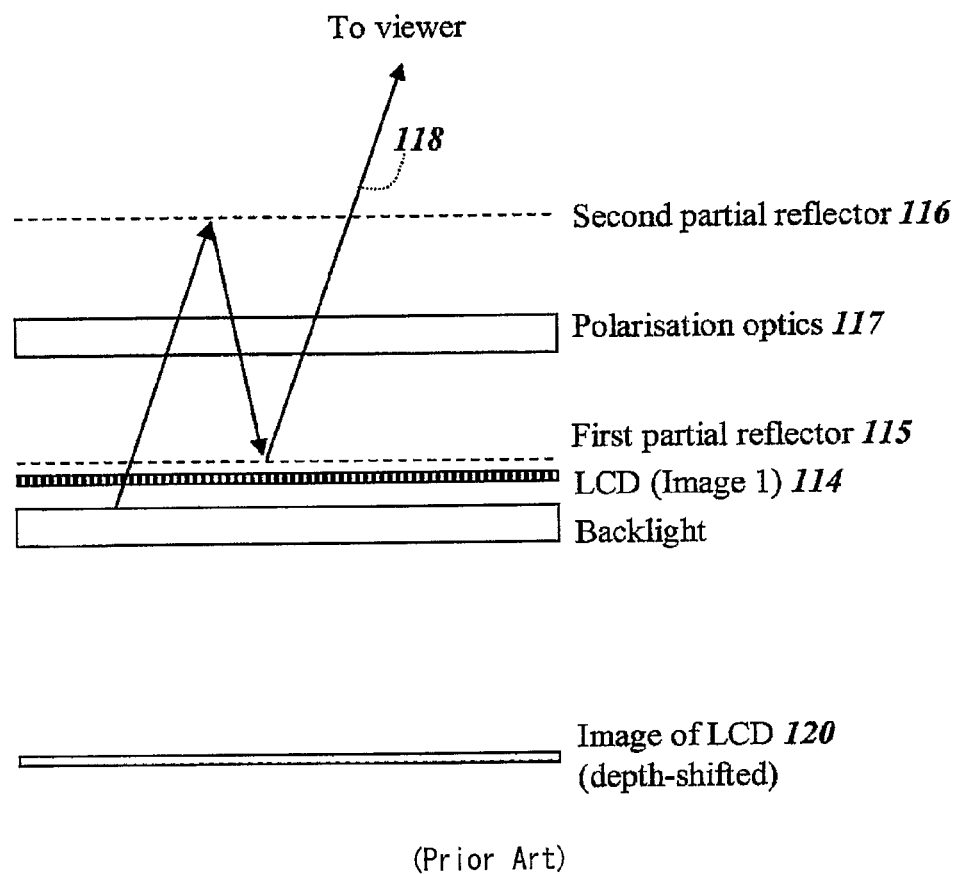
FIGS. 7a and 7b are diagrams illustrating a known dual-depth display.
Figure 7B:
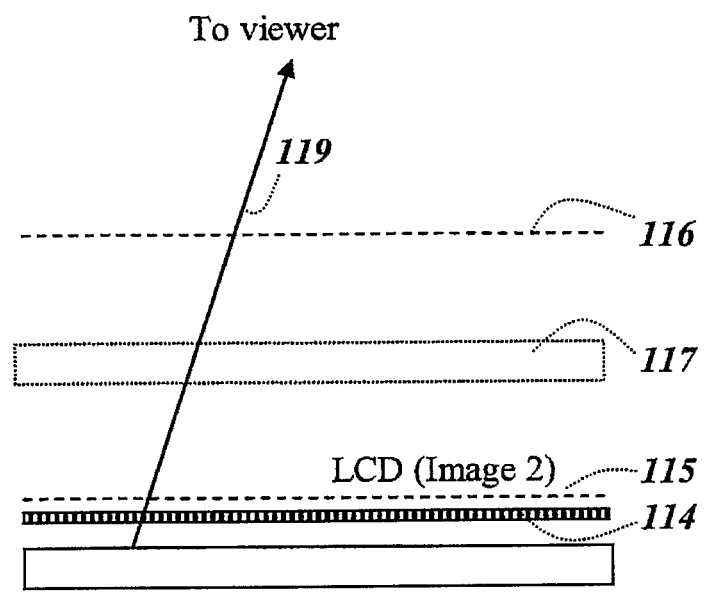
Figure 8A:
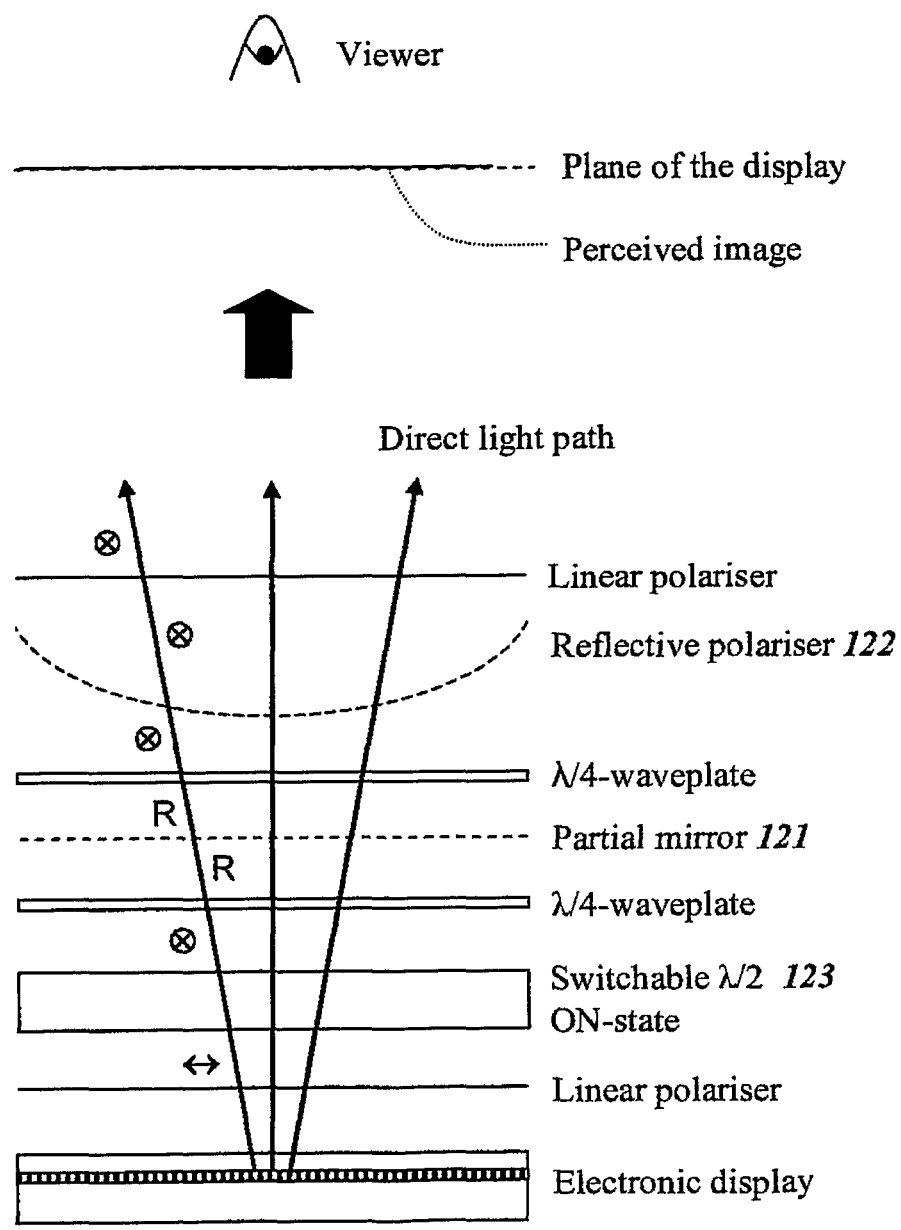
FIGS. 8a and 8b are diagrams illustrating an electrically switchable curved-appearance display as disclosed in GB2449682.
Figure 8B:
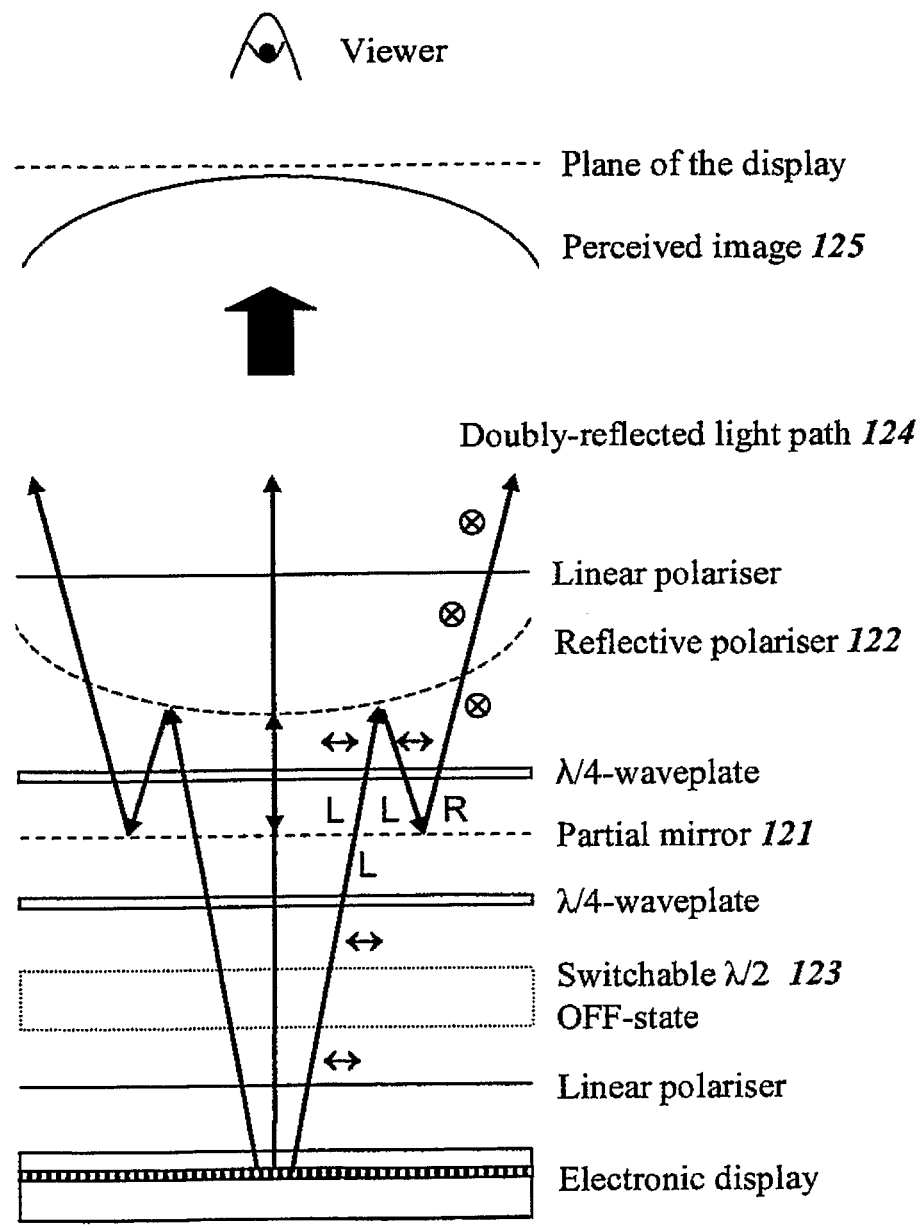

All drawings relating to embodiments of the invention illustrate only ray paths which reach the viewer. Additional rays which are not contributing to the main operation of the display are omitted in order to enhance the clarity of the drawings.

Also, R is used to mean right-handed circularly polarised light and L to mean left-handed circularly polarised light. The symbol ↔ is used in the diagram to show light linearly polarised with its electric field vector in the plane of the drawing and ⊗ is used to show linear polarisation with the electric field perpendicular to the plane of the drawing.

Any element of the system described as 'flat' means that it is planar and parallel to the display device. Any other alternative, for example planar and tilted relative to the display device or partly or continuously curved in one or more directions, is referred hereinafter as 'non-flat'.

In addition, the term 'pseudo-curved' as used herein means any form of distortion from substantially planar and parallel to the display panel. For example the term 'pseudo-curved appearance' could also refer to a 'curved-appearance', a 'wedge-appearance', a 'sinusoidal-appearance', a 'step-appearance' or a 'tilted-appearance'. Also the term 'pseudo-curved image' could refer to a partly or continuously curved image, a tilted image or any other kind of image which is not planar and parallel to the display.

Figure 9B:
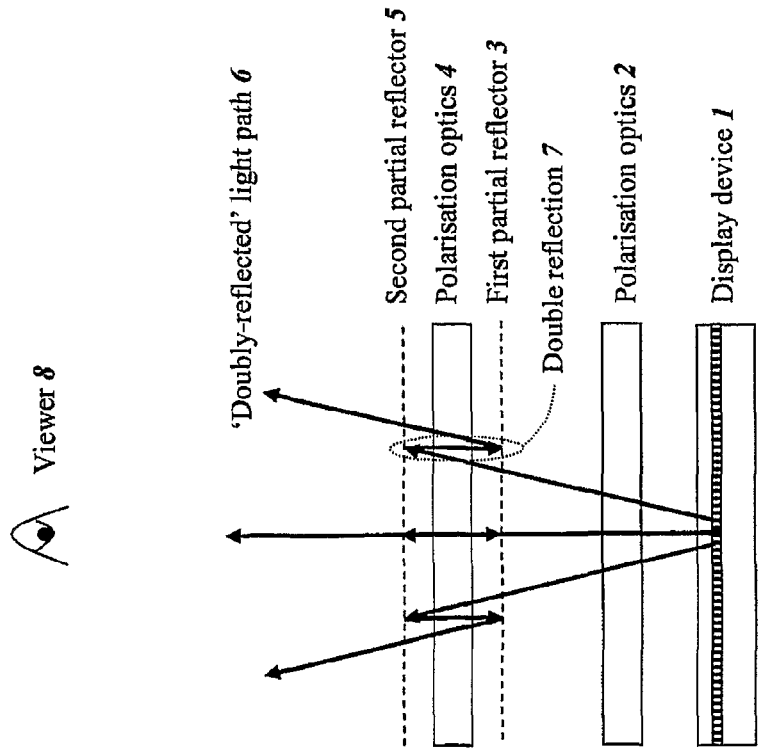
FIGS. 9a and 9b are diagrams illustrating a display constituting a generalised embodiment of the invention.
Figure 9A:
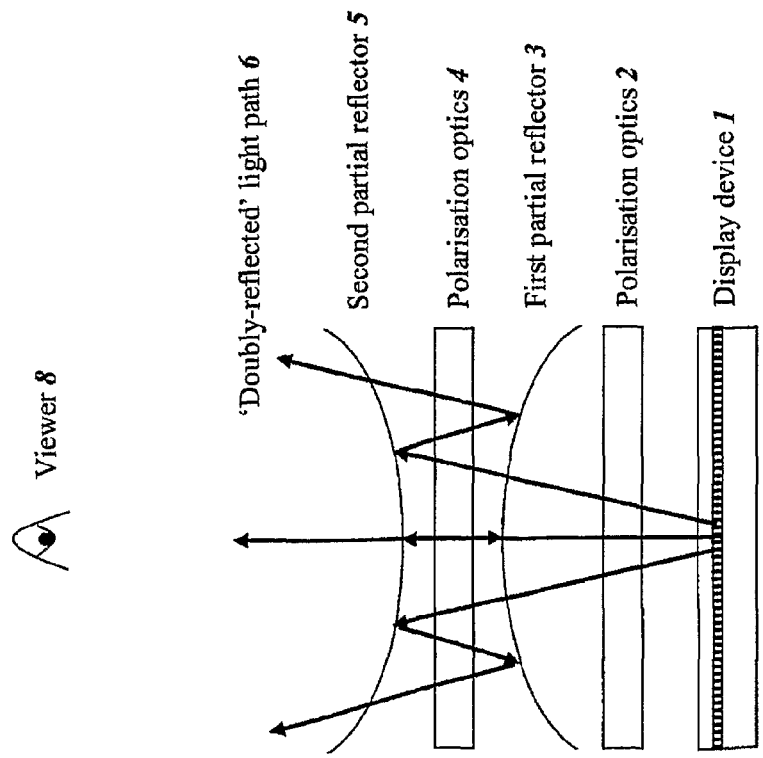

The display shown in FIGS. 9a and 9b comprises a display device 1 capable of outputting light and having a display surface which is substantially flat. First and second partial reflectors 3 and 5 are disposed in front of the display device 1 (on the viewer side thereof) with polarisation-modifying optics 2 and 4 disposed respectively between the display device 1 and the first partial reflector 3 and between the partial reflectors 3 and 5. The partial reflectors 3 and 5 are shaped in an appropriate manner for producing an image with pseudo-curved appearance.

For example, the partial reflectors 3 and 5 may be arranged to reflect one polarisation state of light and to transmit the orthogonal state or may be partially reflecting mirrors (or combinations of reflecting elements) of some other type. The polarisation-modifying optics 2 and 4 are arranged to change at least one polarisation state of light passing in either or both directions through the optics 2 and 4.

The display may be operated in such a way as to switch between a mode displaying standard flat 2D-images and a mode displaying images with pseudo-curved appearance.

In the pseudo-curved mode, or "non-flat image mode", shown in FIG. 9a, the elements 1 to 5 are arranged such that light from images or sequences of images displayed by the display device 1 travels to an extensive viewing region where one or more viewers 8 may be located. Light is at least partially transmitted by the first partial reflector 3 towards the second partial reflector 5. The second partial reflector 5 reflects at least part of this light towards the first partial reflector 3, which reflects at least part of the incident light back towards the second partial reflector 5. The second partial reflector 5 transmits at least part of the reflected light to the viewing region so that image light follows a "doubly reflected" light path 6 before reaching a viewer 8. The display is arranged such that light encoding the image or image sequence is not "emitted", i.e. does not pass directly by transmission through the partial reflectors 3 and 5 to the viewer 8. The partial reflectors 3 and 5 are arranged such that light encoding the image or sequence does not have the same path length in different positions and describes preferably a 'pseudo-curved' shape function. The display thus has a pseudo-curved appearance to allow a viewer 8 to see non-flat images.

In the standard 2D-mode, or "flat image mode", shown in FIG. 9b, light from images or sequences of images displayed by the display device 1 follows the same 'doubly-reflected' optical path 6 as in the pseudo-curved mode. However, the shape given to the partial reflectors 3 and 5 is changed from pseudo-curved to flat. This influences the path that light emitted from the display 1 follows and images appear flat. In this embodiment, the first reflector 3 is selectively switchable between a first non-flat shape (FIG. 9a) and a second flat shape (FIG. 9b) and the second reflector is selectively switchable between a third non-flat shape (FIG. 9a) and a fourth flat shape (FIG. 9b).

If both partial reflectors 3 and 5 are moved close enough to each other, the length of the 'doubly-reflected' light path 6 is shortened in all directions and the double reflection 7 occurring between the partial reflectors 3 and 5 becomes negligible in comparison with the overall light path. Light appears as though following a direct path from the display 1 to the viewing region and the image appears flat and at substantially the location of the display device 1. As an alternative, it will be appreciated that, if partial reflectors 3 and 5 are not moved close enough to each other for the double reflection 7 to be negligible, the image also appears flat but shifted in depth behind the display device 1.

Whether light follows the 'doubly-reflected' path 6 to display images in a standard 2D-mode or in a pseudo-curved mode depends on the shape given to both of the partial reflectors 3 and 5 and may be controlled in a number of different ways. Examples of these will be described in further detailed description of possible embodiments of the invention.

In both the standard 2D-mode and the pseudo-curved mode, the optical system comprising the elements 2 to 5 is arranged such that light which is not following the 'doubly-reflected' light path 6 is prevented from being transmitted by the second partial reflector 5 towards the viewer 8. For instance, light which is incident on the second partial reflector 5 for the first time, for example light emitted by the display device 1 and partially transmitted by the first partial reflector 3, is prevented from leaving the optical system. Specific examples of such arrangements are described in detail hereinafter.

The display device 1 may be any one of different types and still perform the same function. Such types include conventional flat panel displays, flexible displays, curved displays and conformal displays. Spatial light modulator displays, such as Liquid Crystal Displays (LCDs) and projection display systems, and emissive displays, such as Cathode Ray Tube displays (CRTs), Plasma Display Panels (PDPs) and Organic Light Emitting Diode displays (OLEDs), are all, but not exclusively, examples of display devices that may be suitable to be used as pseudo-curved displays. In the case of a spatial light modulator, the display device usually includes a light source.

Figure 10A:
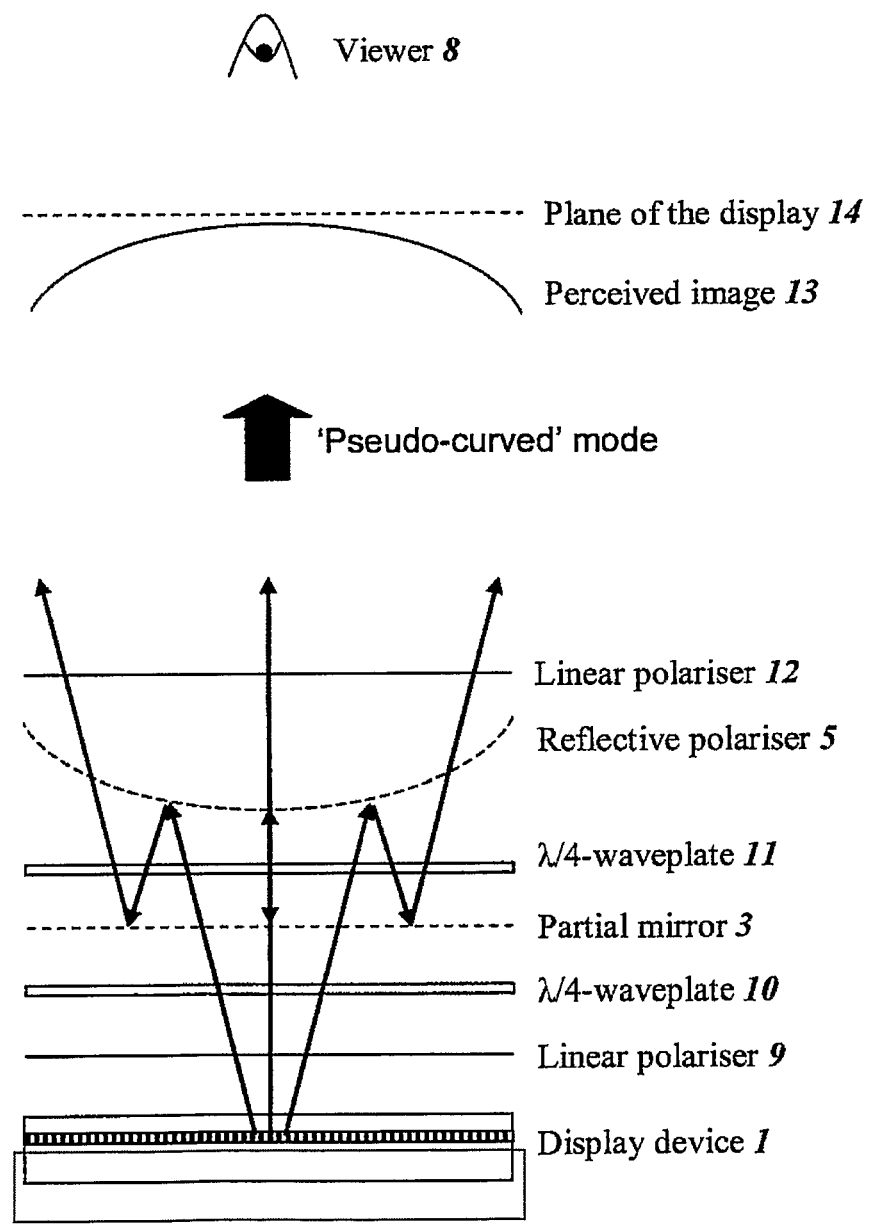
FIGS. 10a and 10b are diagrams illustrating a display constituting a first embodiment of the invention.
Figure 10B:
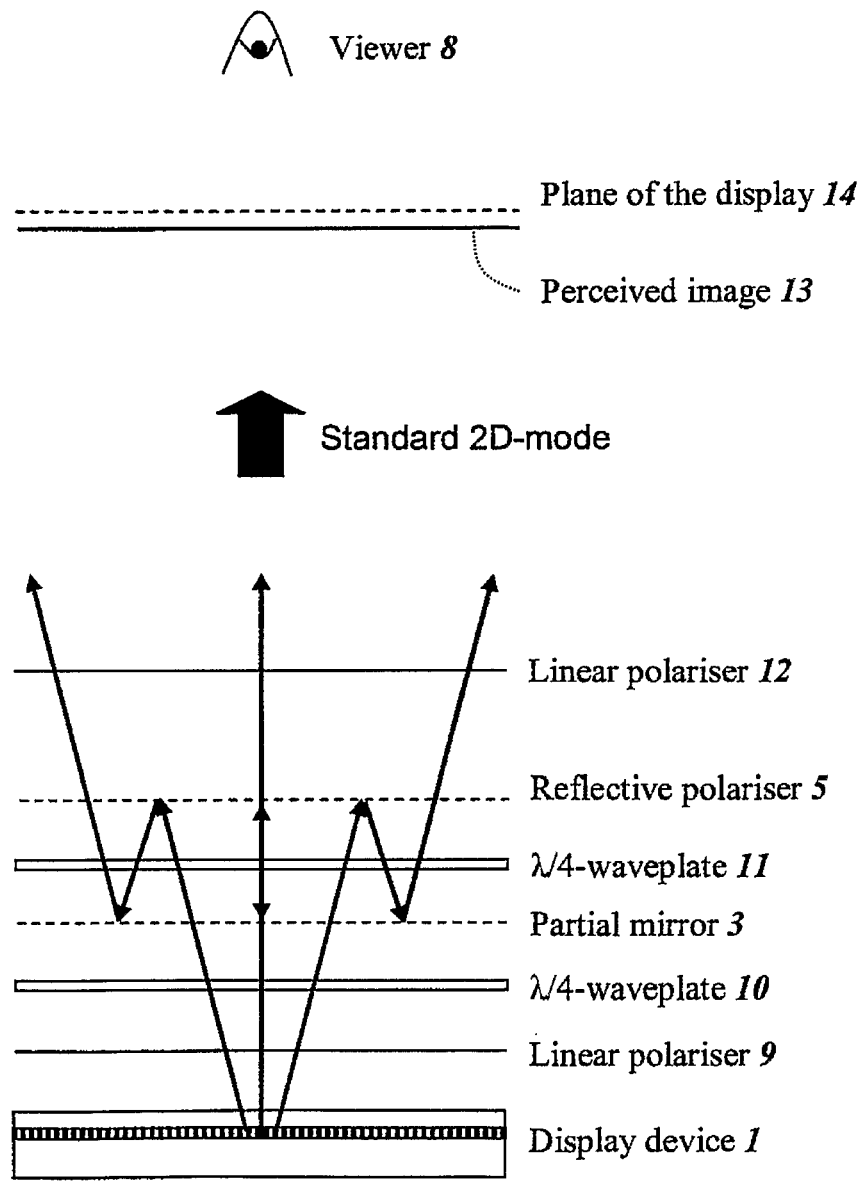

FIGS. 10a and 10b illustrate a display of the type shown in FIGS. 9a and 9b. In this embodiment, a display device 1 is disposed below a stack of optical layers as shown in FIGS. 10a and 10b. For both the pseudo-curved mode and the standard 2D-mode, optical components used in the system are the same. The successive layers are as follows.

A first absorbing "input" linear polariser 9 is disposed in front of the display device 1. An absorbing linear polariser is an element which transmits one linear polarisation state of light, for instance vertically polarised light, and absorbs the orthogonal one, for instance horizontally polarised light.

A first fixed quarter-wave plate 10 is disposed above the first linear polariser 9 and introduces a one-quarter period phase difference between the two linear polarisation states of light passing through it. Such a film is oriented so as to convert incoming linearly-polarised light into circularly-polarised light, or the reverse. Although the first quarter-wave plate 10 may simply comprise a film of birefringent material of the appropriate thickness, such a film performs the quarter-wave function exactly for only a single-wavelength. The first quarter-wave plate 10 may therefore instead be formed from a plurality of birefringent layers in order to provide an element which acts as a more ideal broadband quarter-wave plate for a range of wavelengths across the visible spectrum. Such films are manufactured by Nitto Denko Corporation of Japan, by Sumitomo Denko Corporation of Japan, and by other companies.

The first partial reflector 3 comprises a partially reflecting and partially transmitting mirror. The first partial mirror 3 is also referred to as a "50%" mirror as it reflects substantially half of the incident light and transmits substantially half of the incident light.

The first partial mirror 3 may be realised by coating a thin layer of metal such as aluminium on a transparent substrate or by coating transparent dielectric layers (also referred as a dielectric mirror). Partial reflection may be achieved either by making the reflecting layer uniformly partially transparent or by using a non-transparent mirror with transparent gaps or holes. If these gaps or holes are on a scale smaller than those visible to the eye, the hole or gap pattern will not be visible and the mirror will appear partially reflecting and partially transparent. These gaps and holes may either be created on a regular pattern or include at least some randomness in their design and/or spatial position to avoid Moire fringes and potential diffraction. Another alternative is to make the partial mirror of spatially varying reflectivity in order to help reduce potential Moire fringes due to regular patterning. The reflectivity of the partial mirror may be varied as a function of position either by thinning the layer of metal according to position or by adjusting the spatial patterning according to position.

For mirrors constructed from metal layers, the use of holes or gaps may be preferable to a uniform partial reflector for two reasons: it may be difficult to accurately control layer thickness to achieve a reproducible and uniform reflectivity in a uniform layer, and the dependence of reflectivity on polarisation state may be weaker in a mirror with holes than in a uniformly partially reflecting mirror.

However, in all embodiments described hereinafter, the first partial reflector 3 may be a partial mirror of any type previously described and the fraction of light transmitted or reflected from the first partial mirror 3 may be varied in order to control the relative brightness of the desired image to be displayed.

A second quarter-wave plate 11 is disposed above the first partial reflector 3. This second quarter-wave plate 11 may have the same optical properties as the first quarter-wave plate 10. However, both quarter-wave plates 10 and 11 may be placed in the optical system with different orientations of their fast axes.

The second partial reflector 5 comprises a ("second") reflective linear polariser. A reflective polariser is an optical layer which transmits one linear polarisation state of light while reflecting the orthogonal state. Such a polariser may, for example, comprise a wire-grid polariser of the type manufactured by Moxtek Inc., or a birefringent dielectric interference stack such as the dual brightness enhancement film (DBEF) manufactured by 3M.

The final element in the optical system is a second absorbing "output" linear polariser 12. This second linear polariser 12 is used as the exit polariser and it has the same optical properties as the first absorbing linear polariser 9. In addition, this second absorbing linear polariser 12 is used as a cleaning polariser for absorbing light with the wrong polarisation state that could have leaked from the reflective polariser 5 instead of being reflected as it would be if the reflective polariser 5 was perfect. This linear polariser 12 is also used to reduce reflections of ambient light from the display. Without the absorbing polariser 12, light with its polarisation orthogonal to the transmission axis of the reflective polariser 5 is strongly reflected from the top of the display. This reflected light may interfere with viewing of the display in bright conditions. The absorbing polariser 12 prevents or greatly attenuates such reflected light. To attenuate further this ambient light reflection, an anti-reflection coating layer may be added on top of the exit linear polariser 12. In all embodiments described hereinafter, the exit polariser 12 may be omitted as its role of cleaning polariser is not necessary to the good operation of the display but is only recommended.

This linear polariser 12 may also adopt a non-flat shape. This variation does not change the way in which the display operates, but it may provide enhanced aesthetics to the display itself.

For example, the perceived image 13 of the display may be parallel to the front surface of the display. Such perceived effect may for instance be desirable for automotive applications, particularly dashboard displays, which are requested to follow the curved lines of the car interior. Conversely, the perceived image 13 of the display may not be parallel to the front surface of the display. For example, the curvature may be in opposite directions. Such a perceived effect may be unusual and surprising to the viewer 8 and may thus for instance find application in advertising displays as an enhanced eye-catching effect.

As for all embodiments described hereinafter, optical components constituting the optical system of the pseudo-curved display may be either separated from each other by an air interface or in contact with each other by means of index-matching between layers using an element (such as glue film, fluid or polymer) with an appropriate refractive index. Where an air gap is not required and where the separation in between layers is too large to be filled by an index-matching element only, an additional piece of polymer or glass with the appropriate shape and refractive index may be introduced into the system. Although index-matching between layers is preferable in order to reduce Fresnel reflections within the system and therefore reduce potential losses and imaging problems, one arrangement may in practice be preferable to another according to the application. Where air gaps are used in the system, an anti-reflection film or coating on one or more adjacent surfaces may be desirable.

The first embodiment of this invention provides the capability of optionally utilising the display device 1 as a standard flat display or as a pseudo-curved display. Switching from one mode to the other, and vice versa, doesn't involve any fundamental change in the optical light path but is done by modifying the shape of at least one of the partial reflectors 3 and 5. This shape modification may be achieved mechanically and will be described in more detail hereinafter for various examples.

For instance, such switching capability may be of benefit for large-area advertising displays, which may operate like common conventional displays in the 2D-mode when displaying text information or common banners but which may take advantage of an enhanced aesthetic appearance by switching to the pseudo-curved mode when trying to catch the attention of viewers for a particular advertising video. 2D-mode to pseudo-curved mode switching may also be of particular benefit for amusement displays, which may operate images to suddenly 'jump' from a conventional flat 2D image to a pseudo-curved image when the user has won the jackpot, and so providing the viewer with an image brimming over with presence and realism.

Operation of the display in the pseudo-curved mode is illustrated in FIGS. 11a and 11b. Details of polarisation states of the light and optical axis orientation of most elements of the optical system have been given as an example. However, although many other configurations may be possible, it will be appreciated that further drawings of all embodiments hereinafter may illustrate only one possible orientation.

The linear polariser 9 has a transmission axis 15 oriented in the plane of the drawing and the first quarter-wave plate 10 has a fast axis 16 oriented at 45° to the transmission axis 15. Light coming out from the display device 1 passes through the linear polariser 9 and is polarised with its electric field vector in the plane of the drawing. This light is then converted into left-handed circularly-polarised light by the first quarter-wave plate 10 and strikes the partial mirror 3, which transmits half the light towards the second quarter-wave plate 11 and reflects half the light towards the display device 1.

In the case of an LCD used as the display device 1, light exiting the display is already linearly-polarised and the polariser 9 may be omitted. This statement is true and can be applied to this embodiment and all other embodiments to follow, whenever a linear polariser 9 is used as entrance polariser.

The partial mirror 3 imparts a 180° phase change on reflection causing the left-handed circularly-polarised reflected light to be changed into right-handed circularly-polarised light. This light is then transformed back into linearly-polarised light by the first quarter-wave plate 10, but this time in a direction orthogonal to the plane of the drawing. This linearly-polarised light is then absorbed, and therefore blocked, by the linear polariser 9 and considered as lost within the system.

The, second quarter-wave plate 11 has a fast axis 17 substantially orthogonal to the fast axis 15 of the first quarter-wave plate 10, both quarter-wave plates 10 and 11 being therefore subtractive in transmission. The transmitted left-handed circularly-polarised light is converted by the second quarter-wave plate 11 back into linearly-polarised light with its electric field vector in the plane of the diagram. In this case, incoming light has the same polarisation state as that reflected by the reflective polariser 5 and is then reflected back toward the second quarter-wave plate 11. This linearly-polarised light is converted back into left-handed circularly-polarised light by the quarter-wave plate 11 and strikes again the partial mirror 3.

The portion of this light which is transmitted by the partial mirror 3 is converted by the first quarter-wave plate 10 to light which is linearly-polarised in a direction parallel to the plane of the drawing. This light is transmitted back into the display device 1 by the linear polariser 9 and then considered as lost within the system.

The portion of light which is reflected by the partial mirror 3 undergoes a 180° phase change on reflection causing the direction of circular polarisation to change. In this case, incident left-handed circularly-polarised light is changed into right-handed circularly-polarised light. This reflected right-handed circularly-polarised light passes through the second quarter-wave plate 11 and is changed back to linearly-polarised light with its electric field vector perpendicular to the plane of the drawing. The reflective polariser 5 and the linear polariser 12 have both their transmission axes 18 and 19 oriented perpendicular to the plane of the drawing. Since the incoming light now has the same polarisation state as that transmitted by the reflective polariser 5 and the absorbing polariser 12, it can exit the device and so may reach the viewer 8.

The only light which passes to the viewer 8 is therefore light which follows the 'doubly-reflected' path 6 as described above. As illustrated in FIGS. 10a and 10b and FIGS. 11a and 11b, the reflective polariser 5 is curved so that it is closer to the display device in the centre of the display than at the edges of the display. The light path therefore becomes longer as the viewing position passes towards the edge of the display. The viewer 8 sees an image of the display device 1 that appears curved and below its true position.

Figures 12A, 12B:
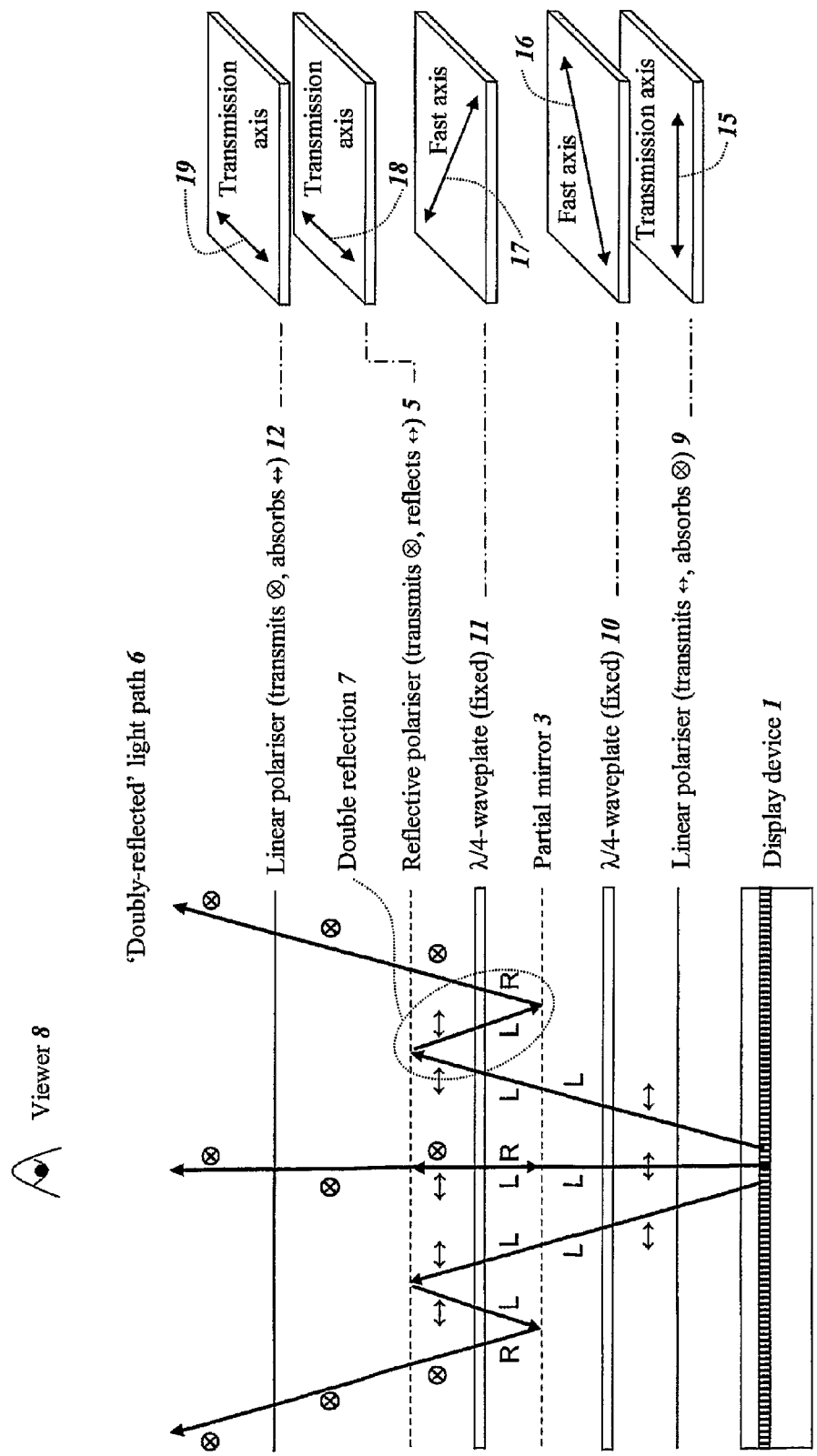
FIGS. 12a and 12b are diagrams illustrating the structure and operation of the display as shown in FIG. 10b.

Operation of the display in the standard 2D-mode is illustrated in FIGS. 12a and 12b. The system uses the same components as described in the pseudo-curved mode. The only difference is that the reflective polariser 5 lies flat in a single plane which is parallel to the display device 1.

In this mode of operation, light emerging from the display device 1 follows the same 'doubly-reflected' light path as in the pseudo-curved mode. However, because both partial reflectors 3 and 5 are flat, this double reflection 7 that light undergoes has, for all viewing angles, a constant length as a function of position within the image. The viewer 8 sees an image of the display device 1 that appears flat.

If the separation in between the partial reflectors 3 and 5 is small enough to make the double reflection 7 negligible in comparison with the overall light path, light reaches the viewer 8 and appears as though following a direct path from the display device 1. The image appears flat in its standard 2D-mode and is observed in substantially the same plane 14 as the display device 1. Otherwise, the image also appears flat in its standard 2D-mode but it is observed shifted in depth behind the display device 1.

An alternative way to achieve the 2D-mode is not to have both partial reflectors 3 and 5 flat, but for them to be everywhere parallel to each other. In this case the extra path length introduced by the double reflection 7 is independent on position within the image, and so the image appears flat. This method of achieving the 2D-mode is best at all viewing angles when the reflective films 3 and 5 are in very close proximity. As the separation between the films increases, the magnitude of the viewing angle from normal incidence at which the image can be regarded to be flat will decrease.

Switching from the pseudo-curved mode to the standard 2D-mode, or vice-versa, may be achieved mechanically by direct modification of the curvature of at least one of the reflective layers 3 and 5. For example, this mechanical switching may be achieved via the use of controlled actuation, through motorised, hydraulic, pneumatic or magnetic elements or simply by hand. Such actuators may be engineered in different ways (known to the person skilled in the art) in order to modify the shape of at least one of the reflective films 3 and 5 in at least one of the three-dimensional directions.

Another way to achieve this mechanical actuation may involve the use of particular materials which undergo a controlled deformation in their shape when subject to a controlled variation of their temperature or the voltage applied across them. There are a number of well-known deformable materials which may be suitable for this application. Some typical examples are converse piezo-electric components which convert a change in electric field into mechanical displacement, electroactive polymers which also result in shape deformation under applied voltage, and bi-metallic components which convert a temperature change into mechanical displacement. Such deformable materials are well-known in the art and are disclosed in standard reference publications on actuators such as "Emerging actuator technologies: a mechatronic approach", by Jose Pons, "Ionic Polymer-Metal Composites (IPMC) As Biomimetic Sensors and Actuators" by M. Shahinpoor, Y. Bar-Cohen, T. Xue, J. O. Simpson and J. Smith (SPIE's Proceedings on Smart Structures and Materials, 1998) and "Modeling MEMS and NEMS" by J. A. Pelesko and D. H. Bernstein.

In the first embodiment and all following embodiments based on a similar configuration, details and configuration of the display system may be varied in a number of ways so as to optimise the performance for different applications.

For example, as described above, the partial mirror 3 reflects approximately 50% of light incident upon it and transmits approximately 50%. This leads to the final perceived image 13 (shown in FIG. 10) seen by the viewer 8 having a brightness which is approximately one-quarter of its original brightness as displayed by the display device 1. Although this brightness value of one-quarter is the highest achievable with the system configuration of this embodiment, it will be appreciated that, for further embodiments of this invention, the optical properties of the partial mirror 3, for instance the reflectivity/transmissivity ratio, may be varied to select the relative brightness of the displayed image. In other words, the partial mirror 3 may be designed for optimum performance of the system.

The reflective polariser 5 may also be replaced by a partial mirror of the same kind as the partial mirror 3. Such an arrangement may not offer any advantages in terms of overall brightness of the display but it may improve image quality and potentially reduce cost.

Some re-ordering and re-orientation of the optical elements are also possible without altering the essential nature of the device and the way in which the display operates. For example, the first and second quarter-wave plates 10 and 11 can be swapped or rotated as long as orientation of their fast axes stays substantially perpendicular. Equally, linear polarisers 9 and 12 can be swapped or rotated as long as their transmission axes are substantially perpendicular and the reflective polariser 5 is rotated such that its transmission axis is parallel to that of the exit polariser 12.

Alternative orientations of the optical elements which function in slightly different ways are also possible. The fast axes 16 and 17 of the first and second quarter-wave plates 10 and 11 may be orthogonal or parallel to each other as long as the transmission axes 15, 18 and 19 the entrance polariser 9, the reflective polariser 5 and the exit polariser 12, respectively, are oriented in suitable directions such that the display operation is not changed.

Another alternative implementation uses the same optical components but re-ordered in a reverse configuration. The pseudo-curved mode is shown in FIGS. 13a and 13b and the standard 2D-mode in FIGS. 14a and 14b. It also functions in slightly different ways from the configuration shown in FIGS. 11a and 11b and FIGS. 12a and 12b, but the display itself still performs the same function.

Light emerging from the display device 1 is converted into linearly-polarised light by the linear polariser 9 (if present in the system). This light passes through the ("first") reflective polariser 5 as the transmission axis 18 of this film is oriented in the same direction as the transmission axis 15 of the entrance polariser 9 underneath. Light is then transformed into left-handed circularly-polarised light by the first quarter-wave plate 10 and strikes the ("second") partial mirror 3. Half the light is transmitted and is absorbed by the exit linear polariser 12, while the other half undergoes a 180° phase change on reflection and is transformed into right-handed circularly-polarised light. This reflected light passes again through the first quarter-wave plate 10 and becomes linearly-polarised with its electric field vector perpendicular to the plane of the diagram. It is then reflected by the reflective polariser 5 and converted to right-handed circularly-polarised light when passing through the first quarter-wave plate 10. This right-handed circularly-polarised light strikes the partial mirror 3 and, once again, half the light is reflected and returns back into the display device 1, while the other half is transmitted. This transmitted light passes through the second quarter-wave plate 11 and is changed to linearly-polarised light which has the same polarisation state as that transmitted by the linear polariser 12. Light can therefore exit the system and reach the viewer 8.

As illustrated in FIGS. 13*a* and 13*b*, in the pseudo-curved mode, the reflective polariser 5 is curved so that it is further from the display device in the centre of the display than at the edges of the display. The doubly-reflected light path 6 is longer towards this direction and an image with pseudo-curved appearance is observed in the viewing region.

As illustrated in FIGS. 14*a* and 14*b*, in the standard 2D-mode, light emerging from the display device 1 follows the same 'doubly-reflected' light path 6 as in the pseudo-curved mode. However, because both partial reflectors 3 and 5 are flat, the viewer 8 sees an image of the display device 1 that appears flat. If the separation between the partial reflectors 3 and 5 is small enough to make the double reflection 7 negligible in comparison with the overall light path, light reaches the viewer 8 and appears as though following a direct path from the display device 1. The image appears flat in its standard 2D-mode and is observed in substantially the same plane as the display device 1. If the separation between the partial reflectors 3 and 5 is too big to consider the double reflection 7 as negligible, the image also appears flat in its standard 2D-mode but it is observed shifted in depth behind the display device 1.

In principle, these variations in the ordering of the optical elements do not change the performance of the display but, because of deviations in the optical elements from ideal behaviour or because of dependence of their properties on wavelength and/or viewing-angle, one arrangement may be preferable to another in practice.

As shown in FIG. 11*a* and 13*a*, the pseudo-curved mode in the first embodiment has been described with the reflective polariser 5 curved so that it is closer to the display device in the centre of the display than at the edges of the display and therefore produces a pseudo-curved image of the display device 1. However, it will be appreciated that modifying the shape of at least one of the partial reflectors 3 and 5 to any other pseudo-curved shape would not have changed the fundamental way in which the display system works, but only given the image reaching the viewer 8 a different pseudo-curved appearance.

Figure 15:
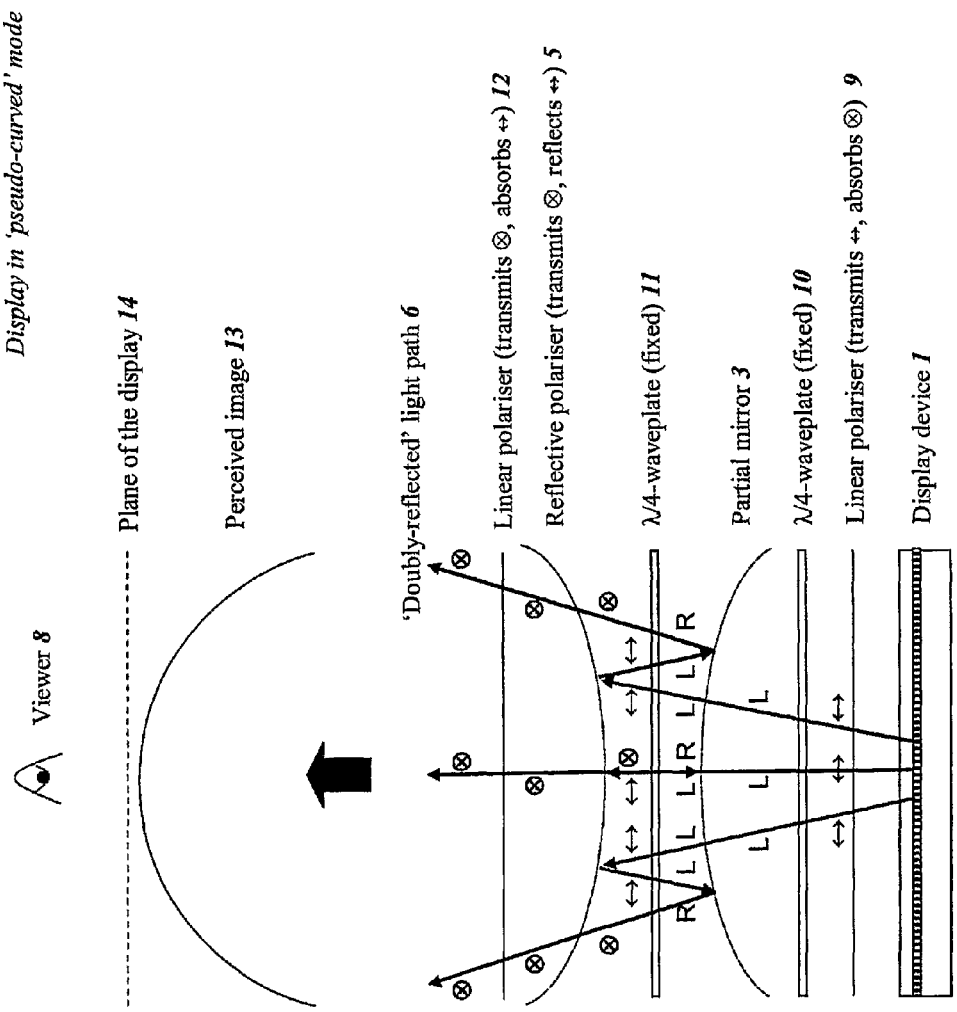
FIG. 15 is a diagram illustrating a further modified structure and operation of a further example of the first embodiment of the invention.

FIG. 15 illustrates the pseudo-curved mode of a display in which both partial reflectors 3 and 5 are given a pseudo-curved shape in order to increase the perceived pseudo-curved-appearance 13 of the display device 1. Light emanating from the display device 1 passes through the entire optical system as described previously. Once again, partial reflections within the optical system occur and light follows a "doubly-reflected" path 6. This time however, because both the partial mirror 3 and the reflective polariser 5 are curved and in opposite directions so that they are closer to each other in the centre of the display than at the edges of the display, the optical light path 6 becomes even longer towards the edge of the display and the pseudo-curved appearance perceived in the image is greater than if only one of the partial reflectors 3 and 5 had been given the same pseudo-curved shape.

In this configuration, the partial mirror 3 and the reflective polariser 5 are curved and in opposite directions so that they are closer to each other in the centre of the display than at the edges of the display. It will be appreciated that, for the first embodiment and all embodiments hereinafter, the shape into which they may be deformed may vary with the preferred pseudo-curved appearance that a desired application requires. Alternative implementations are illustrated in FIGS. 16 to 18 but potential possibilities are not limited to those examples only.

Figure 16A:
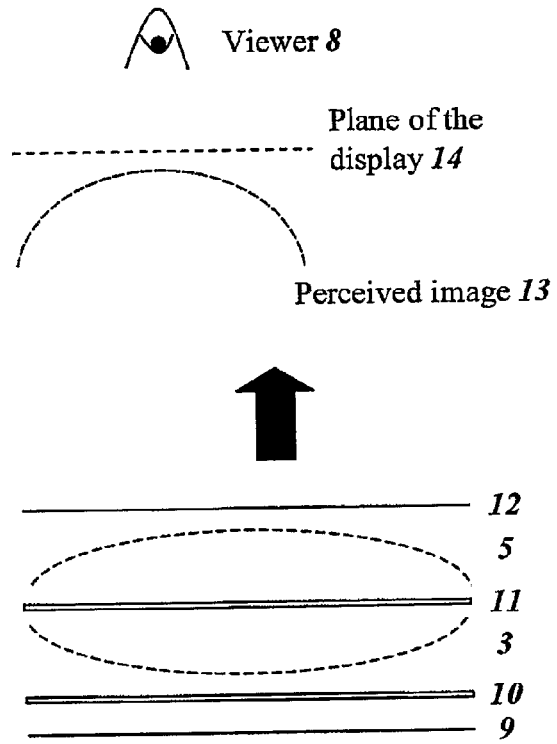
Figure 16B:
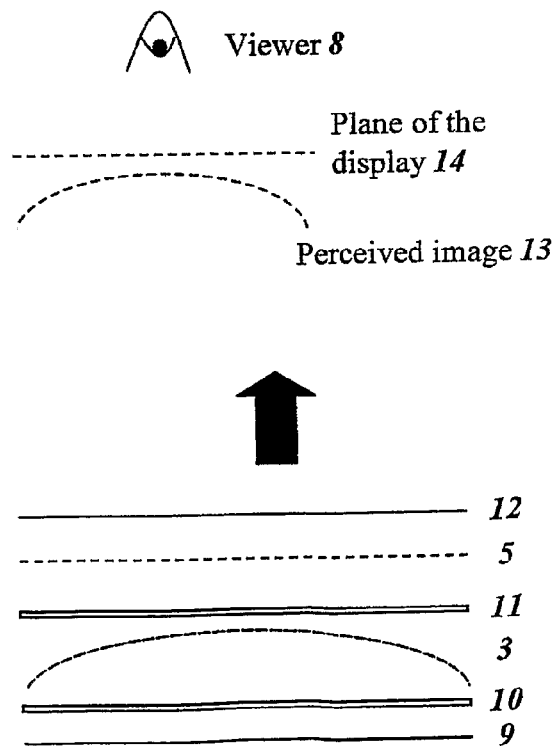

For instance, FIG. 16*a* shows a configuration where both the partial mirror 3 and the reflective polariser 5 are curved and in opposite directions so that they are further from each other in the centre of the display than at the edges of the display. In FIGS. 16*b* and 16*c*, only the partial mirror 3 is curved while the reflective polariser 5 is flat. In the arrangements shown in FIGS. 16*a* to 16*c* and in the previous descriptions of this first embodiment, the partial reflectors which are given a pseudo-curved shape are continuously curved in at least one direction to provide an image which is smoothly convex or concave towards a viewer and which appears behind the display device 1.

The pseudo-curved shape given to at least one of the reflective films 3 and 5 may be more complicated, and therefore may lead to more complex appearances of the perceived image 13 of the display, as shown in FIGS. 17 and 18. FIG. 17*a* shows a partial reflector having a serpentine cross-section to provide a smoothly or continuously curved wave-like partial reflector. FIG. 17*b* shows a partial reflector comprising a plurality of flat segments where adjacent segments abut each other along an edge and subtend an angle greater than 0° and less than 180°. These two kinds of partial reflector would provide the viewer with an image which has respectively a 'wavy-appearance' and a 'prismatic-appearance' and which appears in both cases behind the display device 1.

The pseudo-curved shape given to at least one of the partial reflectors 3 and 5 may be made such that the image appears planar but tilted with respect to the display device 1. Such configuration may be of benefit for off-axis viewers who would wish to see the display image as if they were looking on-axis, i.e. the image appearing in a plane perpendicular to their line of sight. FIG. 17*c* shows an example of this configuration where both the partial mirror 3 and the reflective polariser 5 are tilted about the vertical axis of the display, so creating an image which appears tilted relative to the display device 1 and also behind it.

It may also be that the desired appearance of the display is non-flat only in certain regions of the display area. So long as the desired image shape is one continuous surface, then this can still be made from continuous reflective films, but only part of at least one of the reflective films 3 and 5 changes shape under actuation. This is illustrated in FIG. 18*a* for the case where the pseudo-curved part of the image is tilted with respect to the display device 1, and this is continuous with the flat part of the image. The required shape given to the reflective polariser 5 is therefore two planes joined by a linear hinge.

However, it may be that the desired image plane is not continuous. An example is illustrated in FIG. 18*b*, where, although all parts of the image are flat and parallel to the display panel, they are not all co-planar, i.e. there are discontinuous jumps in the depth of the image perceived by the observer. The image appears like 'depth-staggered' behind the display device 1. In this particular example, the centre of the image appears closer to the observer than the rest of the image. In order to achieve such pseudo-curved appearance, it is necessary to have at least one of the reflective films 3 and 5 made from more than one piece and to position them in different planes, as illustrated in FIG. 18b. Further, when combined with the actuation methods described previously, the pieces of reflective film may be moved with respect to each other and have their shape modified.

FIG. 18c shows another particular example of a pseudo-curved display, in which both partial reflectors 3 and 5 have exactly the same shape and are everywhere parallel to each other. As mentioned previously, if these two reflective films were in very close proximity over the entire display area, the image would appear flat to the viewer at all viewing angles. However, when the separation in between the films is relatively large, the image appears flat to a viewer on-axis but adopts a pseudo-curved appearance as the viewer moves off-axis.

Of course the scope of this first embodiment is not limited to the particular designs illustrated in FIGS. 16a to 18c. When combined with the switching mechanisms described above, any of these particular film configurations could become flat, tilted with respect to the display device 1, curved or have any other possible pseudo-curved design.

FIGS. 16a, 17a and 17c also show examples where both partial reflectors 3 and 5 are non-flat and are mirror-images of each other in a plane mid-way between the partial reflectors.

Rather than trying to achieve a particular pseudo-curved appearance by modifying the shape of a single partial reflector, it may be preferable to combine the shape of both partial reflectors 3 and 5 to achieve the same desired pseudo-curved appearance. For example, the reflective polariser 5 may be continuously curved in the horizontal direction while the partial mirror 3 is continuously curved in the vertical direction, both with a finite radius of curvature; such shape combination would lead to a dome-shaped appearance.

A further advantage of having at least one reflective layer 3 and 5 with the ability of having its shape modified, ideally from flat to non-flat and vice versa and from non-flat to non-flat, is that, because many combinations of shapes are achievable, it is possible to make a display appear pseudo-curved in a variety of different shapes and also potentially below or in front of the plane 14 of the display device 1.

The first embodiment of this invention relates to a pseudo-curved display which has the ability to switch between a flat image mode and a non-flat image mode, or vice versa, or between different non-flat image modes. This is achieved by actuation of at least one of the partially reflective layers 3 and 5 in at least one of the three dimensional directions. It will be apparent to those skilled in the art that the controlled actuation of at least one of these variable shape partial reflectors may provide the display with the ability to display not only an image which simply appears flat or an image which simply appears non-flat, but also an image whose appearance may vary in time.

Figure 19:
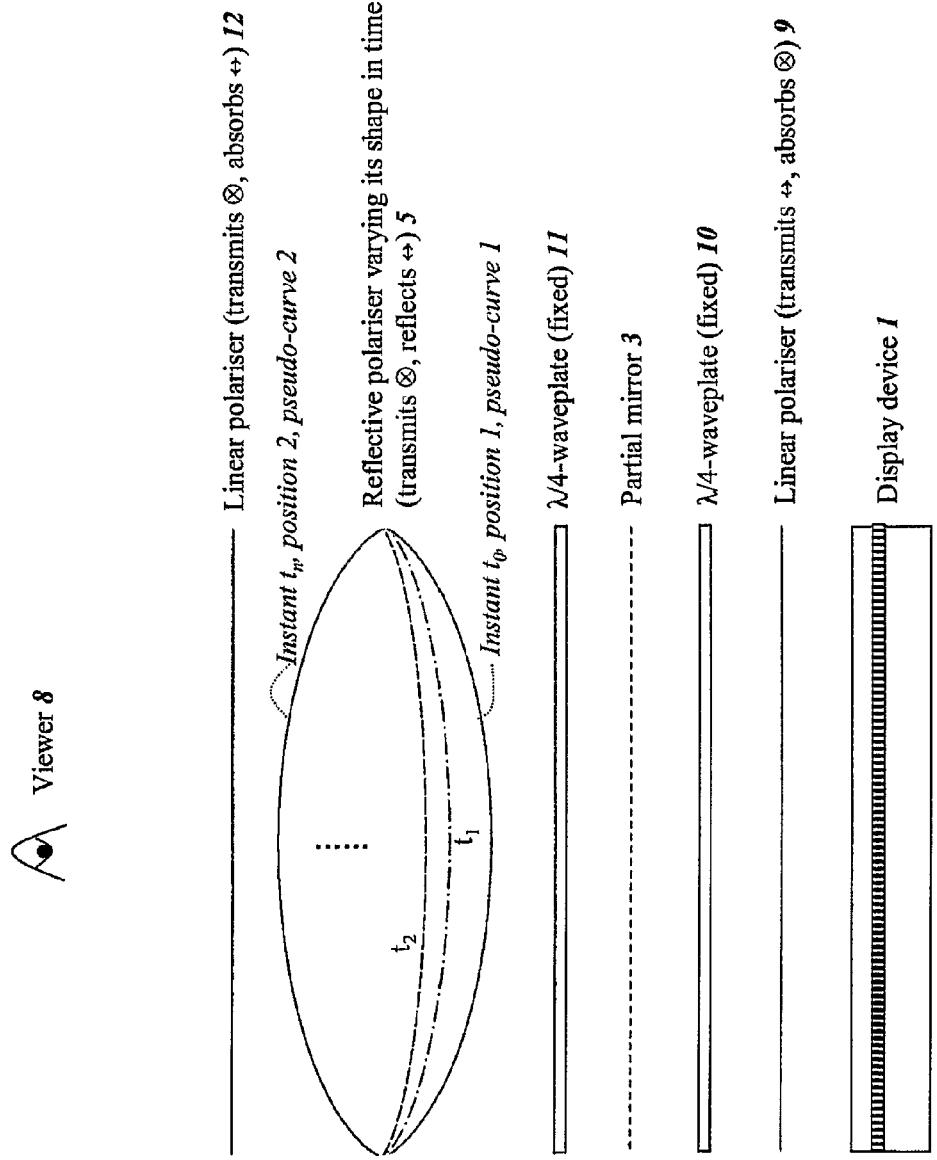
FIG. 19 is a diagram illustrating a further modified structure and operation of a further example of the first embodiment of the invention.

For example, as illustrated in FIG. 19, at least one of the reflective layers 3 and 5 may be actuated so that it moves from a pseudo-curved shape 1 in position 1 at the instant t0 to a pseudo-curved shape 2 in position 2 at the instant tn, both positions being different and describing different pseudo-curved shapes. This variation in time thus provides intermediate positions and pseudo-curved images at intermediate times, one of which may appear flat to the viewer.

In a particular example of this first embodiment, the shape given to the reflective polariser 5 may be varied relatively quickly in time to obtain the controlled oscillation shown in FIG. 19. The reflective polariser 5 is shown as being curved so that, at the instant t0 it is closer to the display device 1 in the centre of the display than at the edges of the display, and at the instant tn it is further to the display device 1 at the centre of the display than at the edges of the display.

For instance, a display operating in such way may be of interest for enhancing the aesthetic appearance of advertising displays and the attractiveness of amusement displays by varying in time the pseudo-curved appearance of the displayed image. The motion of the pseudo-curved appearance of the display may for instance be an appealing effect.

As illustrated in FIGS. 10 to 19, only at least one of the partial reflectors 3 and 5 has a pseudo-curved shape when the display is functioning in the pseudo-curved mode. Other elements of the system, for example the quarter-wave plates 10 and 11, have always been described as flat. However, it will be appreciated that optical elements different from the partial reflectors 3 and 5 may also be modified into a pseudo-curved shape, particularly when they are glued or index-matched to at least one of the partial reflectors. Although in principle such arrangements do not affect the principle of operation of the device, in practice, because of deviations of elements from their ideal behaviour or because of wavelength dependence or viewing-angle dependence, one configuration may be preferable to another in terms of overall performance.

However, some particular arrangements given to the reflective layers 3 and 5 may lead to imaging issues. For example, if at least one of the reflective films has been shaped in a slightly incorrect way and/or if the reflective films have not been disposed exactly in the required positions relative to each other, some imaging issues such as magnification, de-magnification or distortion of the displayed image may occur. In order to correct for such potential imaging issues, a carefully selected lens system 20 may be disposed within the optical system as illustrated in FIG. 20 and may at least partially correct for image magnification or de-magnification and/or distortion.

The chosen lens system 20 may be positioned anywhere within the optical system and is designed to optimise the correction benefit. For instance, the lens system 20 may be placed between the upper reflective polariser 5 and the exit linear polariser 12 and may comprise a single lens, a Fresnel lens or a micro-lens array.

Figure 20:
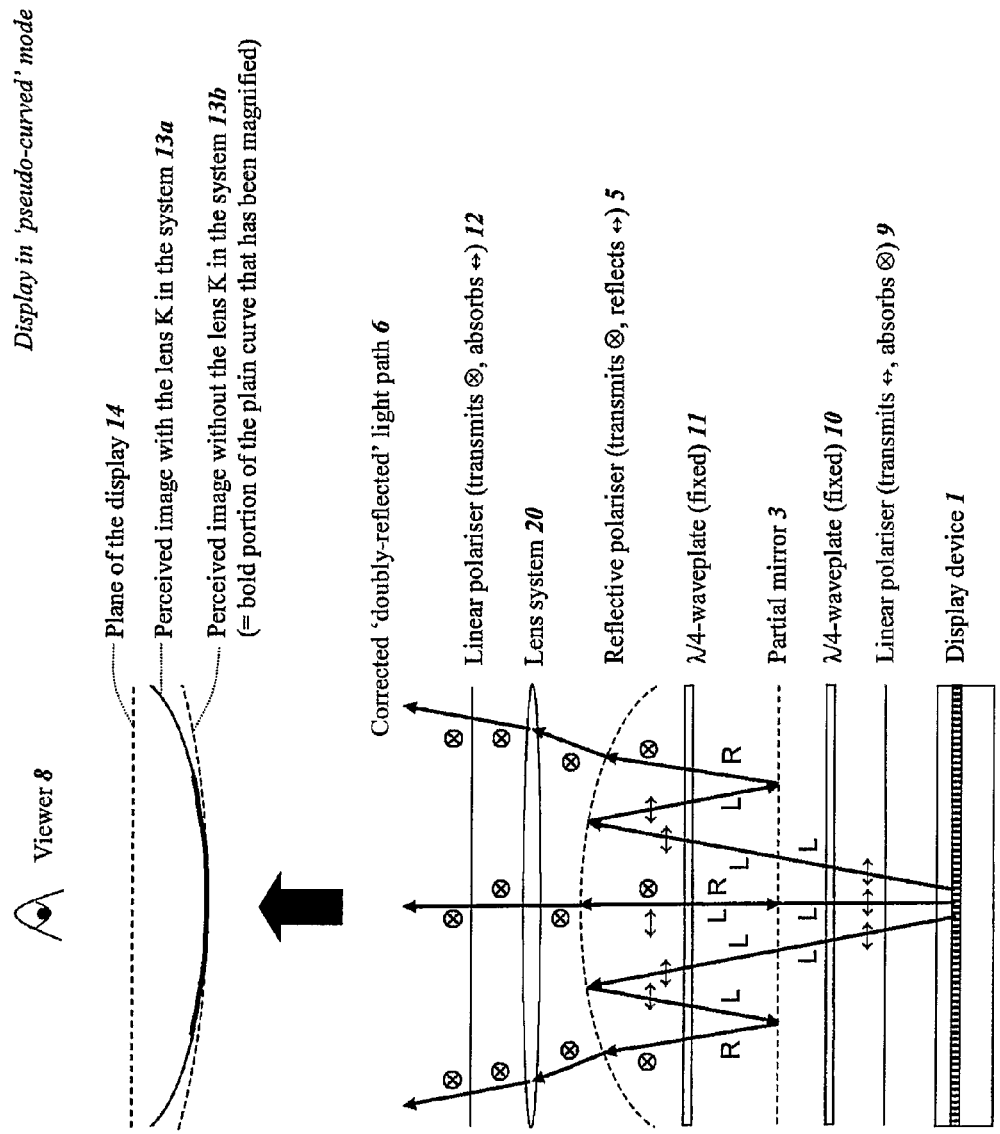
FIG. 20 is a diagram illustrating a display constituting a further modified example of the first embodiment of the invention.

By way of particular example, the reflective polariser 5 may be curved so that it is further from the display device in the centre of the display than at the edges of the display as shown in FIG. 20, while the partial mirror 3 is substantially flat. In such a case and with no additional lens system 20 in the optical system, the image of the display 13b perceived by the viewer 8 would normally be magnified. When adding an appropriately chosen lens system 20 between the reflective polariser 5 and the linear polariser 12, the operation of the display until light passes through the reflective polariser 5 is not changed with regard to the display shown in FIG. 10. However, magnified light emerging from the reflective polariser 5 passes through the lens system 20, which rectifies for the image magnification by adjusting the light path. By means of this lens system 20, light exiting the system follows the corrected 'doubly-reflected' light path 6 and the image of the display 13a perceived by the viewer 8 has the expected pseudo-curved appearance.

Figure 21:
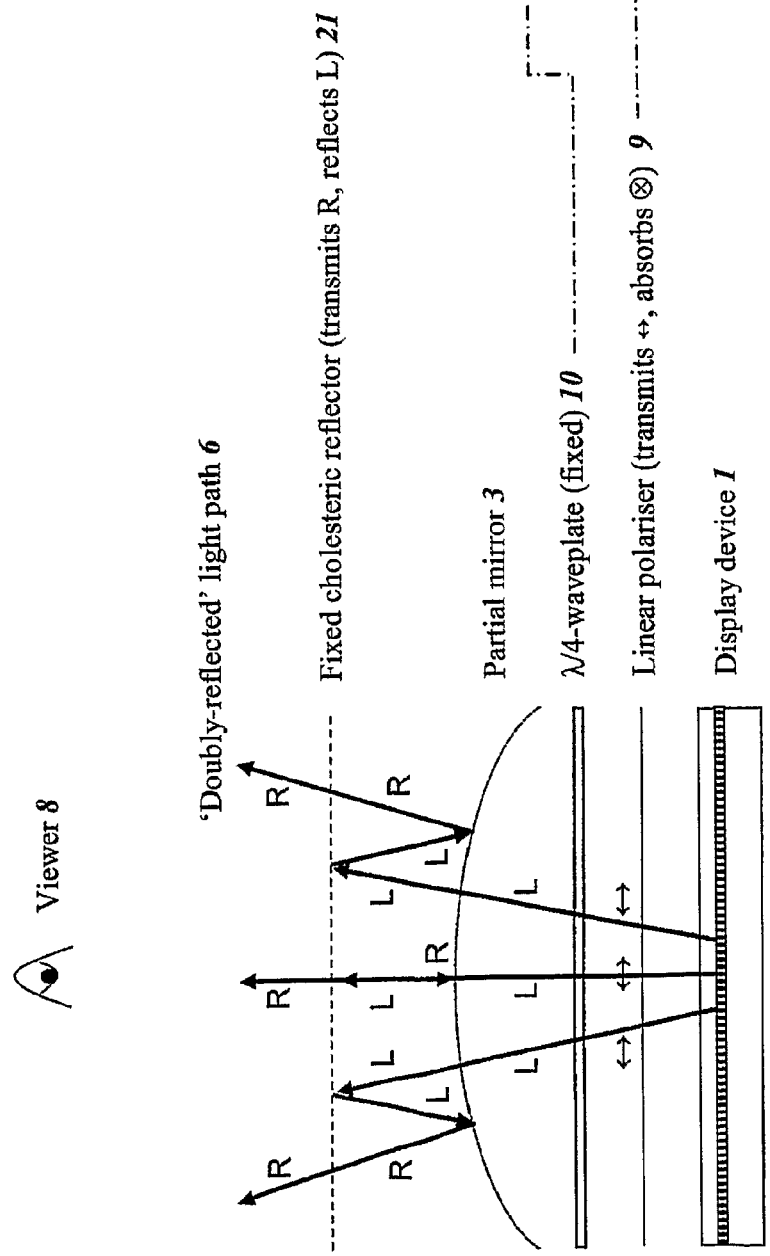
FIGS. 21a and 21b are diagrams illustrating a display constituting a second embodiment of the invention.

A second embodiment of the invention is illustrated in FIGS. 21a and 21b. The only element in this embodiment which is not also described in the previous embodiment is a cholesteric reflector 21. This is a liquid-crystal layer with a natural helical structure which causes it to reflect one circular polarisation state while transmitting the other. Such partial reflectors are well-known and are disclosed in standard books on liquid crystal technology, for example "Liquid Crystal Displays: Addressing Schemes and Electro-optic Effects", by Ernst Lueder (Wiley-SID Series in Display Technology, 2001). In this embodiment, such a partial reflector is fixed and unswitchable. The liquid crystal layer may have been fixed in place by polymerisation of the liquid crystal molecules themselves or by polymerisation of an accompanying monomer.

In the display shown in FIGS. 21a and 21b, the first partial reflector comprises a partial mirror 3 whereas the second partial reflector comprises the fixed cholesteric reflector 21. This cholesteric layer 21 is chosen so that it reflects, for instance, left-handed circularly-polarised light and transmits right-handed circularly-polarised light. The display device 1 is placed beneath a linear polariser 9 with a transmission axis 15 parallel to the plane of the drawing and the quarter-wave plate 10 is oriented with its fast axis 16 at 45° to the transmission axis 15.

Light emerging from the display device 1 passes through the entrance linear polariser 9 and is linearly-polarised with its electric field vector oriented parallel to the plane of the drawing. Light is then changed into left-handed circularly-polarised light by the quarter-wave plate 10 and strikes the partial mirror 3. A portion of the light is transmitted by the partial mirror 3 whereas the other portion is reflected back towards the display device 1. The reflected light undergoes a 180° phase change on reflection at the partial mirror 3 and is then changed into right-handed circularly-polarised light, which is converted by the quarter-wave plate 10 to linearly-polarised light with its electric field vector perpendicular to the plane of the drawing and absorbed by the linear polariser 9. The left-handed circularly polarised light transmitted by the partial mirror 3 is reflected by the fixed cholesteric reflector 21 and goes back towards the partial mirror 3. Once again, a portion of this light is transmitted by the partial mirror 3, converted by the quarter-wave plate 10 to linearly-polarised light with its electric field vector in the plane of the drawing and passes through the linear polariser 9 back into the display device 1. The portion of light reflected by the partial mirror 3 undergoes a 180° phase change of its polarisation state. This remaining light is therefore right-handed circularly-polarised and can pass through the fixed cholesteric reflector 21 in the direction of the viewing region.

As the partial mirror 3 is continuously curved so that it is closer to the cholesteric reflector 21 in the centre of the display than at the edges of the display, the 'doubly-reflected' light path 6 is longer towards this direction and an image with convex appearance is observed below the display device 1.

As mentioned hereinbefore, different orders and other orientations may be given to the optical elements of the display without altering the essential nature of the device and the way in which the display operates. However, even if in principle these variations do not change the principle of operation of the display, in practice some deviations of the components from ideal behaviour may lead to a "best" order of the elements in terms of display performance in any specific example.

Figure 22:
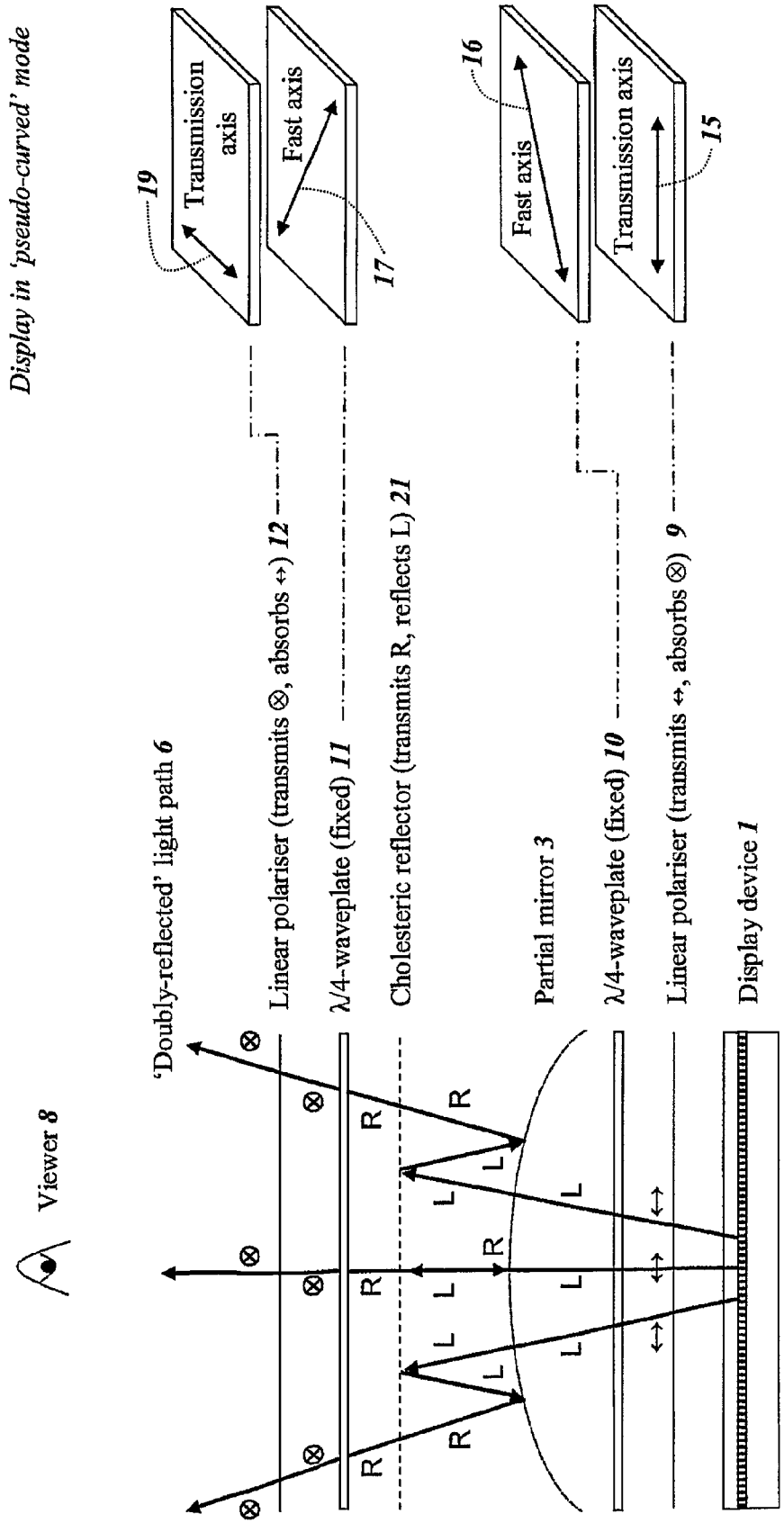
FIGS. 22a and 22b are diagrams illustrating a modified structure and operation of another example of the second embodiment of the invention.

Displays which output circularly-polarised light may suffer from reduced contrast ratio. In order to correct for this limitation, a second quarter-wave plate 11 and an exit linear polariser 12 may be added on top of the cholesteric reflector 21 to transform the circularly-polarised light into linearly-polarised light. An example of this alternative implementation is shown in FIGS. 22a and 22b. The second quarter-wave plate 11 is oriented with its fast axis 17 orthogonal to the fast axis 16 of the first quarter-wave plate 10 and the exit linear polariser 12 has its transmission axis 19 perpendicular to the plane of the drawing. Although adding those two components 11 and 12 to the optical system may in principle improve the performance of the display, one configuration may be preferable to the other in any application example.

FIGS. 21a and 22a show a pseudo-curved appearance display in which the partial mirror 3 is curved so that it is closer to the cholesteric reflector 21 in the centre of the display than at the edges of the display. The same pseudo-curved appearance effect may also be obtained by modifying the shape of the cholesteric reflector 21 instead of the partial mirror 3.

As in the case of all embodiments of this invention, according to the application and in order to generate the desired pseudo-curved appearance, the shape of at least one of the reflecting layers has to be modified in a pseudo-curved manner. It will be appreciated that, although most of the accompanying drawings describe a pseudo-curved partial reflector which is continuously curved in a convex or concave shape in order to facilitate understanding of the display system, at least one of the partial reflectors may be modified to any pseudo-curved shape in at least one of the three-dimensional directions. In addition, it will be understood that any of the at least one of the partial reflectors has also the ability of being actuated to vary the image appearance from flat to non-flat or between different non-flat modes.

The use of partial reflectors results in a large brightness loss within the system. In theory, if the brightness of the display device 1 combined with the linear polariser 9 is 100%, then the brightness of the display described in the first embodiment is at best only 25% due to the way in which the device operates.

Figure 23:
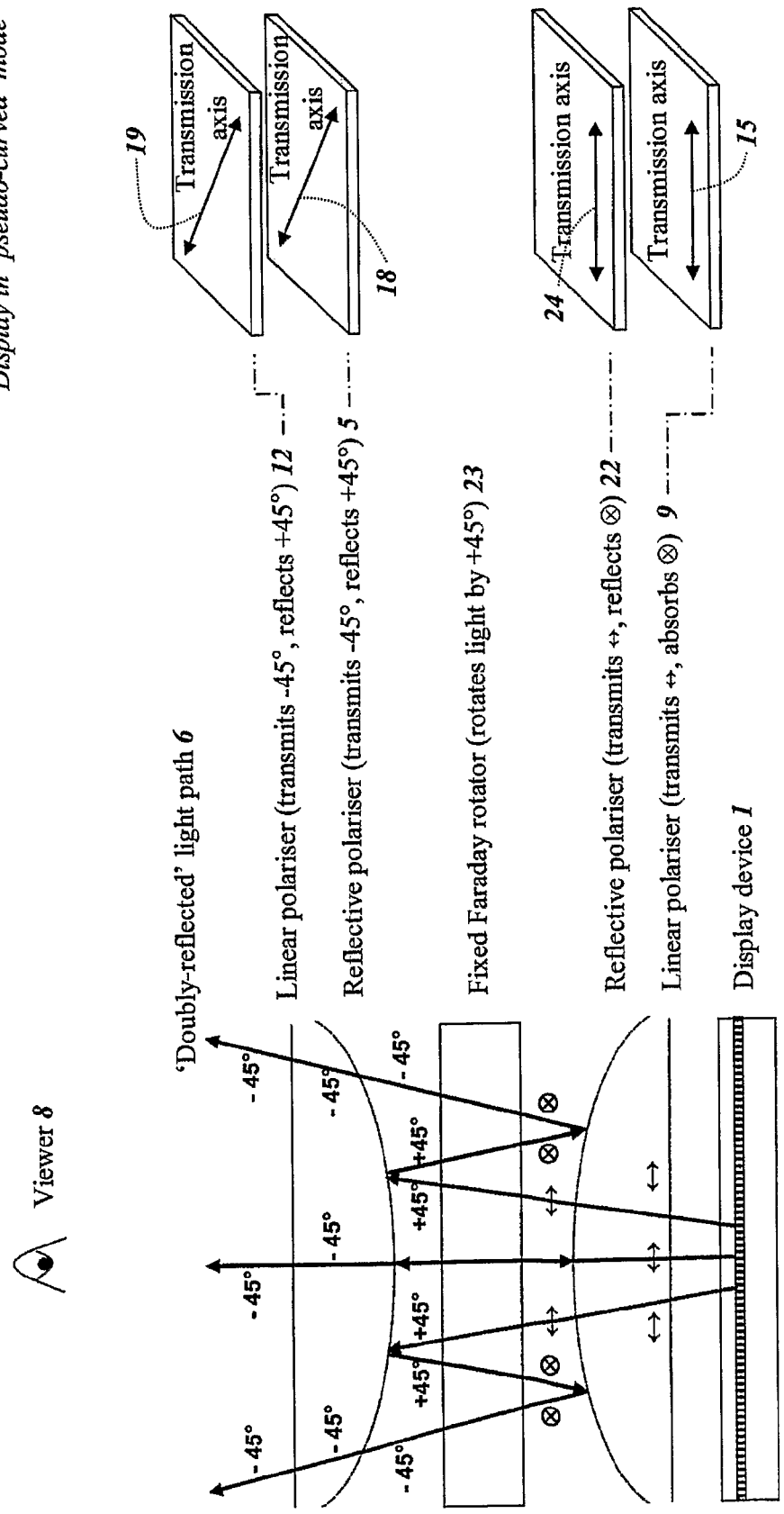
FIGS. 23a and 23b are diagrams illustrating a display constituting a third embodiment of the invention.

The third embodiment of the invention is shown in FIGS. 23a and 23b and comprises a device which may provide a substantial improvement to the efficiency of light utilisation and hence a substantial increase in the overall brightness of the pseudo-curved appearance display.

The display described in this embodiment differs from the previously described display in that the optical arrangement in front of the display device 1 comprises two reflective polarisers 22 and 5, between which is disposed a fixed Faraday rotator 23. An entrance linear polariser 9 is disposed below the reflective polariser 22 and an exit linear polariser 12 is disposed above the reflective polariser 5. For example, the transmission axes 15 and 24 of the linear polariser 9 and the reflective polariser 22 are parallel to each other and oriented in the plane of the drawing, whereas the transmission axes 18 and 19 of the reflective polariser 5 and the linear polariser 12 are parallel to each other and oriented at −45° with respect to the transmission axes 15 and 24. The Faraday rotator 23 rotates the polarisation of linearly-polarised light by +45° upon passage of the light in either direction through the rotator 23.

Both linear polarisers 9 and 12 are not necessary to the good operation of the system and their presence does not change the essential nature of the system. For example, another implementation of the display may omit either or both of these two absorbing polarisers 9 and 12 but still perform the same function. In principle, these variations do not change the performance of the display and the way in which it operates but, in practice, one arrangement may be preferable to another.

The Faraday rotator 23 comprises layers of material which rotates the polarisation state of light passing therethrough by an angle proportional to the magnetic field applied to the layers. The principle of operation of such devices is well-known and described in standard reference texts, for example Optics by E. Hecht and A. Zajac, fourth edition, Addison Wesley, 2003.

An important difference between Faraday rotators and other elements which rotate the polarisation state of light is that Faraday rotators are non-reciprocal. In other words, if a beam of light is sent through a Faraday rotator onto a mirror and then returns through the Faraday rotator, its polarisation is rotated by a total of 2θ, where θ is the angle of rotation caused by one pass through the Faraday rotator. This contrasts with optically active materials such as chiral liquid crystals, where the net result after two passes through the material and one reflection would be no change in the polarisation state.

As illustrated in FIGS. 23a and 23b, light emerging from the display device 1 passes through the entrance linear polariser 9 and is linearly-polarised with its electric field vector in the plane of the drawing. The transmission axes 15 and 24 of the linear polariser 9 and the lower reflective polariser 22 are also oriented parallel to the plane of the drawing so that light reaches the fixed Faraday rotator 23. The plane of polarisation is then rotated by +45° by the Faraday element 23, causing the light to reflect from the upper reflective polariser 5. In its second pass through the Faraday rotator 23, the plane of polarisation of the reflected light is rotated by a further +45° and so emerges with its electric field vector oriented perpendicular to the plane of the drawing so that the light is then reflected by the lower reflective polariser 22 and passes again through the Faraday rotator 23, which rotates the polarisation plane by a further +45° so that the electric field vector of the remaining light is oriented at −45°. Light is finally transmitted through the upper reflective polariser 5 and the exit linear polariser 12.

Light which reaches the viewer 8 therefore follows the 'doubly-reflected' light path 6. As both reflective polarisers 22 and 5 are continuously curved so that they are closer to each other at the centre of the display than at the edges of the display, the 'doubly-reflected' light path. 6 is also longer towards the edges of the display and the viewer 8 sees the display with a convex appearance.

An advantage of this arrangement is that it provides substantially full-brightness images in both the 2D-mode and the pseudo-curved mode. In practice, some losses will occur as light passes through or is reflected by the various optical elements. However, no attenuation takes place due to the intended operation of the optical elements, as is the case with the first and second embodiments.

Figure 24:
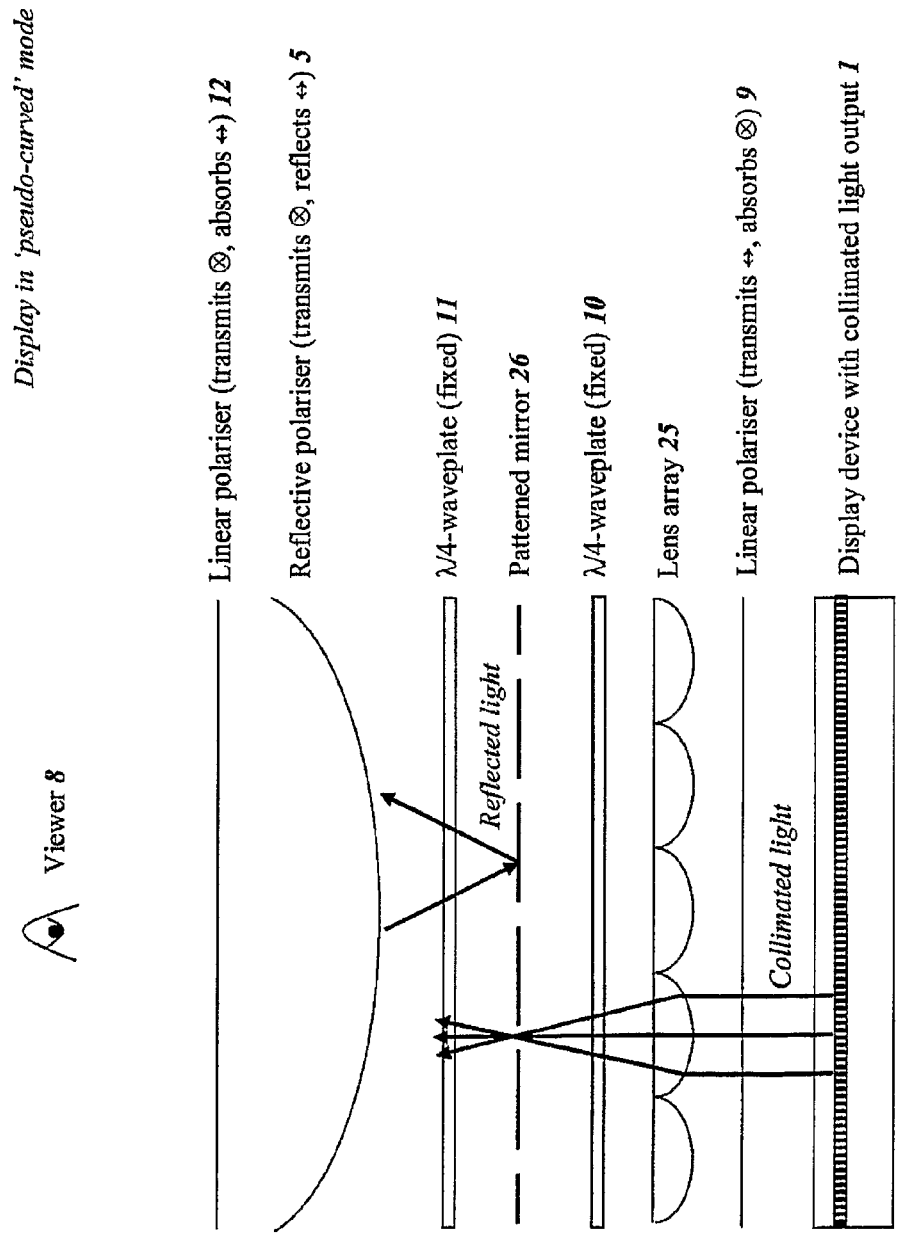
FIG. 24 is a diagram illustrating a display constituting a fourth embodiment of the invention.

A fourth embodiment of the invention is illustrated in FIG. 24. A disadvantage of the 'doubly-reflected' light path 6 which is at the origin of the pseudo-curved display is that the use of partial reflectors generates a large brightness loss within the system. In theory, if the brightness of the display device 1 combined with the linear polariser 9 is 100%, then the brightness of the display described in the first embodiment is at best only 25% due to the fundamental way in which the display operates.

This fourth embodiment illustrates a modification to the device, which may provide a substantial improvement in the efficiency of light utilisation and hence a substantial increase in the overall brightness of the pseudo-curved display. In this embodiment, a lens array 25 is used together with a display device with collimated light output 1 and a highly reflective patterned mirror 26. The patterned mirror 26 is designed such that it is predominantly reflective with small transparent regions. The patterned mirror 26 is designed to be substantially in the focal plane of the lens array 25.

As illustrated in FIG. 24, the relatively collimated light from the display device 1 emerges substantially normally to the image plane and passes through the linear polariser 9 before striking the lens array 25. The lenses in the array are designed to focus the light through the transparent regions of the patterned mirror 26. This system thus produces a high transmission of light through the patterned mirror 26. Light reflected from the reflective polariser 5 is incident on the patterned mirror 26. Since the patterned mirror 26 is predominantly reflective, high reflectivity can be achieved.

The rest of the system works in a similar manner to the previous embodiments. An image with pseudo-curved appearance is generated due to the 'doubly reflected' light path 6 within the system and the pseudo-curved shape given to at least one of the reflective layers 5 and 26.

In the case of an LCD used as the display device 1, light exiting the display is already linearly-polarised and the polariser 9 can be omitted from the system. Assuming the collimated light from the display device 1 is transmitted through the patterned mirror 26 with an efficiency of 90% and reflected from the same patterned mirror 26 with an efficiency of 90%, the theoretical brightness of the pseudo-curved image would increase from 25% to 80%.

Lenses of the array element 25 may be spherically converging lenses or cylindrically converging lenses. However, optical parameters of the lenses are chosen such that incoming collimated light from the display device 1 is focused through the holes in the patterned mirror 26. For example, the lens array 25 may comprise an array of cylindrical or square lenses, but what is important is that the lens system 25 is designed to focus light through the apertures of the patterned mirror 26.

The display may be operated in any of the ways described hereinbefore. At least one of the reflective layers may be non-flat in any direction in order to generate the desired pseudo-curved appearance according to the application. Again, at least one of the partial reflectors may be capable of being actuated in such a way that switching between standard flat images and different pseudo-curved appearance images is possible. In addition, some re-ordering and re-orientation of the optical elements are possible without altering the essential nature of the display and the way in which it operates. However, even if in principle these variations do not change the performance of the display, in practice some deviations of the components from ideal behaviour may lead to a "best" order of the elements in any specific example.

Figures 25A, 25B:
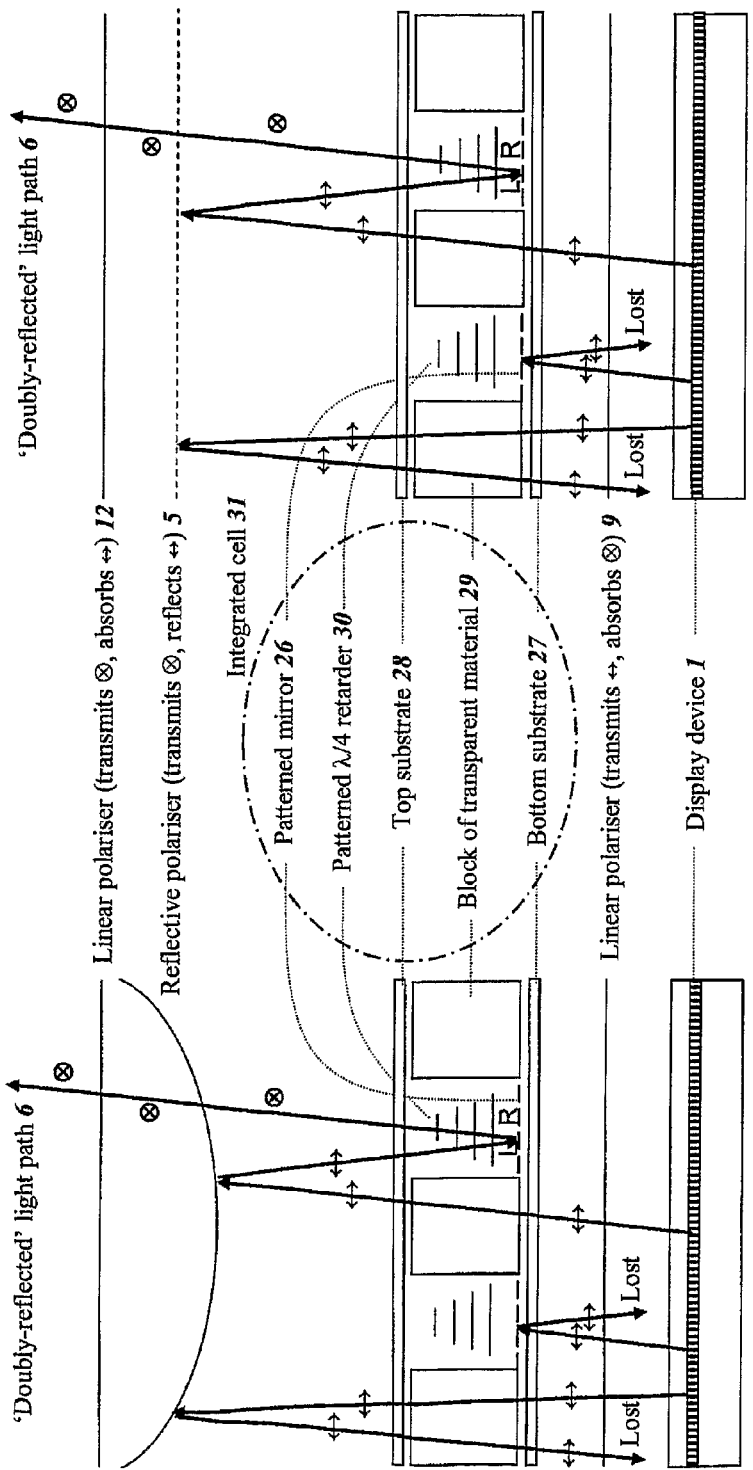
FIGS. 25a and 25b are diagrams illustrating a display constituting a fifth embodiment of the invention.

FIGS. 25a and 25b illustrate a fifth embodiment of the invention, in which the display is of the same general type as that described in the first embodiment, but where the quarter-wave function of 10 and 11 and the partial mirror function of 3 in FIGS. 10a and 10b are integrated together in a single integrated cell 31.

A patterned mirror 26 is designed such that it partially transmits light through small transparent regions and partially reflects light incident upon highly reflective regions. The patterned mirror 26 design is optimised in order to avoid fringe problems and to enable alignment of a liquid crystal layer on it.

As shown in FIGS. 25a and 25b, the patterned mirror 26 is disposed between a first substrate 27 and a second substrate 28, which may be glass or plastic substrates. A patterned quarter-wave retarder 30 is then disposed with retarding portions on all highly reflective regions of the patterned mirror 26, while blocks of transparent non-retarding material 29 are disposed on all transparent regions of the patterned mirror 26. For example, the patterned quarter-wave retarder 30 may be a fixed liquid crystal layer and each block of transparent material 29 inside the cell may be a polymer wall whose height is such that the thickness of the liquid crystal region corresponds to a quarter-wave plate.

Light emerging from the display device 1 passes through the entrance linear polariser 9 and is polarised with its electric field vector in the plane of the drawing. A portion of light strikes the reflective region of the patterned mirror 26 and is reflected back through the display device 1, while the other portion is transmitted through the transparent regions of the patterned mirror 26 and through the block of transparent material 29. Transmitted light is then reflected by the reflective polariser 5 back towards this integrated cell 31. A portion of this reflected light passes directly through the transparent regions of the cell 31 and is lost within the system. The other portion first passes through the patterned quarter-wave retarder 30, which converts light from linearly-polarised to left-handed circularly-polarised. It is then reflected by the patterned mirror 26, which imparts a 180° phase change to its polarisation state, converting it into right-handed circularly-polarised light. This light travels back through the patterned quarter-wave retarder 30 to exit the integrated cell 31 with its polarisation state oriented perpendicular to the plane of the drawing. This light is then transmitted by the reflective polariser 5 and the exit linear polariser 12 and reaches the viewer 8.

As for previous embodiments, the combination of the 'doubly-reflected' light path 6 and the shape given to the reflective polariser 5 dictates the image appearance observed by the viewer 8.

As shown in FIG. 25a, the partial reflector 5 may for example be curved so that it is closer to the display device 1 in the centre of the display than at the edges of the display. Such an arrangement produces an image of the display which appears continuously convex to the viewer 8. However, when no pseudo-curved shape is applied to the partial reflector 5, as illustrated in FIG. 25b, the image of the display appears flat in its standard 2D-mode.

Using such an integrated cell 31 has the advantage of reducing the number of optical components within the system and therefore may have an influence on manufacturing cost. It also reduces the number of times light has to pass through a retarder and therefore may help to reduce potential imaging issues due to polarisation errors.

Fixed patterned optical retarders, such as the retarder 30 shown in FIGS. 25a and 25b, may be made in a variety of ways. A first method uses liquid crystal elements as disclosed for instance in U.S. Pat. No. 6,624,683 (23 Sep. 2003, JACOBS Adrian Marc Simon; ACOSTA Elizabeth Jane; HARROLD Jonathan; TOWLER Michael John; WALTON Harry Garth) and WO/2003/062872 (31 Jul. 2003, RYAN Timothy George; HARVEY Thomas Grierson). For example, the liquid crystal material may comprise a polymerisable liquid crystal material such as a reactive mesogen made by Merck. Such materials may be polymerised during manufacture so as to reduce the sensitivity of the liquid crystal cell to humidity, temperature and mechanical damage.

Another method of making a fixed patterned retarder uses an initially uniform retarding layer of the same type as the retardation films 10 and 11, i.e. a film of birefringent material with the appropriate thickness. The retarder function may be destroyed in regions which are required to provide no retardation function, or these regions which are required not to have a retarder function may simply be physically removed following the desired pattern. Examples of methods of destroying or removing the retarder material include exposure to ultraviolet irradiation, chemical etching, photolithographic development, laser machining and standard cutting.

Figure 26A:
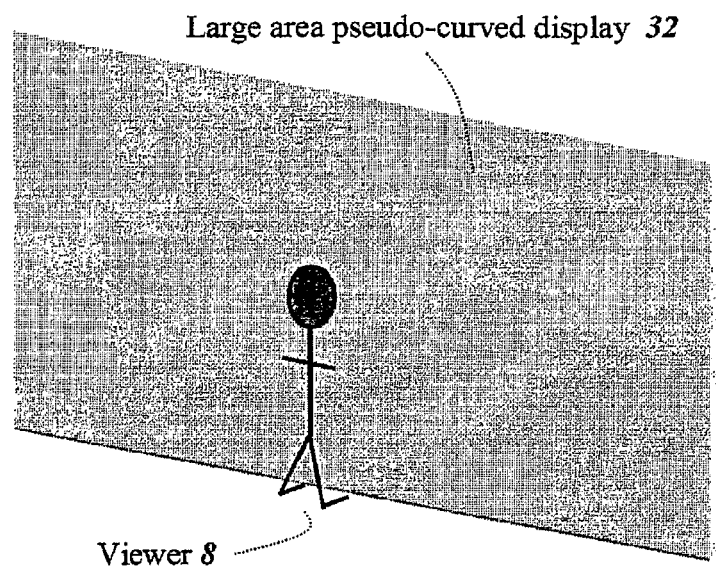
FIGS. 26a and 26b are diagrams illustrating a display constituting a sixth embodiment of the invention.
Figure 26B:
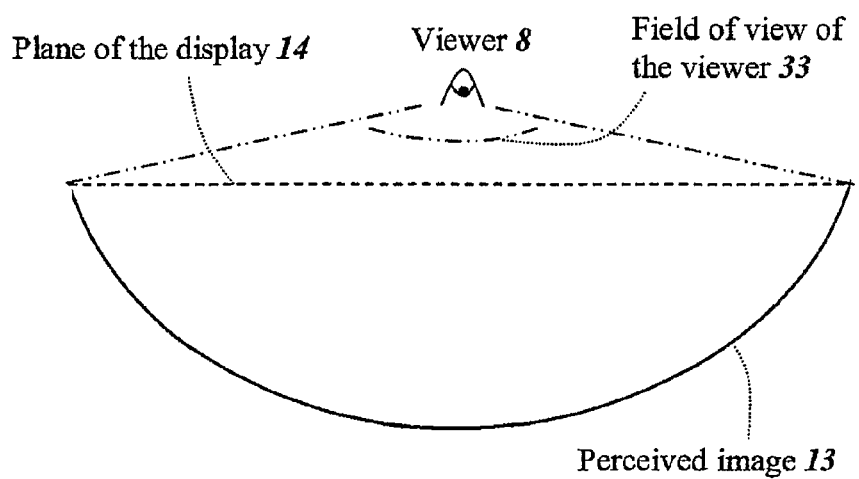

A sixth embodiment of the invention is illustrated in FIGS. 26a and 26b. This embodiment refers to another type of application for a pseudo-curved display, which produces an immersive sensation to the viewer 8. For example, when the viewer 8 stands close enough to a large-area pseudo-curved display 32 such that the displayed image substantially covers the viewer's field of view 33, and when the pseudo-curved appearance display is designed to produce a perceived image 13 that appears to curve into the plane of the display 14, then the viewer 8 may feel a great sense of immersion when looking at the display 32.

In all of the embodiments described hereinbefore, some imaging issues may occur and disturb the appearance of the pseudo-curved image produced by the display. For example, a viewer 8 may move up and down while correctly perceiving the displayed images. However, it is possible that viewer movement from side to side results in imaging issues so that the curved appearance effect is compromised. Some light intended to follow the 'doubly-reflected' light path 6 may leak directly out of the optical system via the direct light path and mix up the pseudo-curved appearance of the displayed image. Such leakage results in imaging issues, called crosstalk, which should be reduced so as to be substantially imperceptible to the viewer 8. The main reason why such crosstalk is likely to happen is that polarisation-manipulating optical elements used in the system are generally not perfect, in particular not off-axis. For example, linear and reflective polarisers generally transmit some of the "wrong polarisation", retarders have behaviours which depend on orientation, wavelength and processing conditions and liquid crystal elements do not generally only transmit light with the correct polarisation state.

A first possible hardware solution for reducing for this kind of crosstalk and improve the pseudo-curved display performance may be by adding one or more compensation films. For instance, disposing view-angle compensation films above and/or under the retardation plates 10 and 11 may improve the viewing-angle properties of the pseudo-curved display.

Another possible method of correcting for this type of crosstalk is by manipulating the original image data to the display. For example, if the percentage of light leaking through the direct light path is small and known for each primary colour component, a correction function may be applied to the image data values such that the image formed in the plane not intended to be seen becomes faint and nearly imperceptible to the viewer 8. This correction function may be of either a linear type or a non-linear type according to the level of correction required. For example, an image processor may be used for remapping colour channels of the image pixels. However, a downside of such crosstalk correction method is that the image quality of the display, particularly contrast ratio, may be deteriorated.

Figures 27A, 27B:
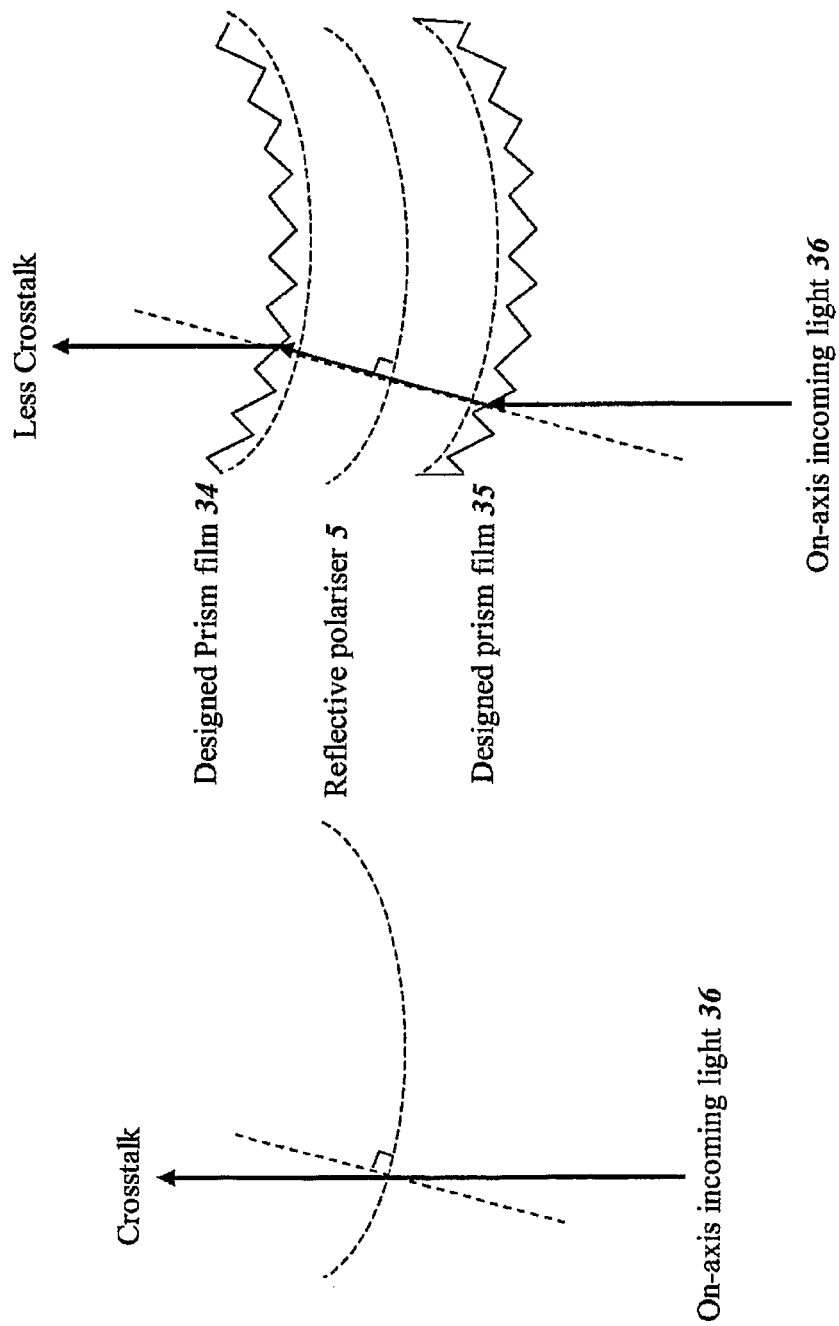
FIGS. 27a and 27b are diagrams illustrating a crosstalk mechanism and an arrangement for reducing such crosstalk.

As previously mentioned, polarisation-manipulating optical elements, such as the reflective polariser 5, are not perfect and may show poor optical performance off-axis. When pseudo-curved, even on-axis incoming light 36 may strike the reflective polariser 5 at an angle and therefore contribute to crosstalk as shown in FIG. 27a. As illustrated in FIG. 27b, crosstalk resulting from this source may be reduced by using designed prism films 34 and 35 located on each side of the reflective polariser 5, which films modify the direction of light through the curved reflective polariser 5. These prism films may be designed with different or varying apex angles and may be metallised on one of their prismatic sides in order to improve light recycling and uniformity. The first prism film 34 is used to redirect on-axis incoming light 36 to be substantially, or nearer to, normal incidence on the reflective polariser 5 in the areas where it is pseudo-curved and the second prism film 35 redirects light to exit the system with substantially the same direction as the incident light 36, i.e. on-axis. By adding these two optimised prism films 34 and 35, the reflective polariser 5 acts on on-axis light as if it was perfectly, or at least more, flat, so that imaging issues on-axis are reduced. The rest of the system works as described hereinbefore. An image with pseudo-curved appearance is generated due to the 'doubly-reflected' light path 6 within the system and the pseudo-curved shape given to at least one of the reflective layers.

Another example of an imaging issue which may occur with the pseudo-curved appearance display technology is related to the pseudo-curved shape of the partial reflectors. As mentioned previously in the first embodiment, some arrangements given to the reflective layers 3 and 5 may lead to magnification or de-magnification problems of the displayed image. Correction for this type of imaging issue is possible by hardware modification of the optical system, such as adding a lens system as shown in FIG. 20. However a simpler method may be based on software implementation.

Correction in an image processor controlled by software for image curvature or distortion may also be applied in a number of ways. Two examples follow.

In the first example, knowledge of the distortion is used to obtain a function which describes the image curvature, ideally parametrically in "x" and "y" coordinates on the output image surface. In order to avoid "holes" in the corrected image, i.e. pixels not mapped from the distorted original image, the process is applied to every pixel on the output. The function describing the distortion is used to provide the location on the source image to sample for each output pixel. This may involve sampling over a number of pixels in the neighborhood of the indicated source pixel in order to maintain image quality. The output image is then displayed as normal.

In the second example, knowledge of the distortion, or the surface causing it, is used to create a 3D object representing the distortion. Texture mapping in computer graphics hardware may be used to warp the input image onto the surface such that, when projected correctly on the display, the image appears to have no distortion. The warp may occur by projecting the source image, as if from the point of view of somebody observing the display, onto the surface representing the distortion.

Thus, image distortion by the or each non-flat one of the first and second partial reflectors 3, 5 may be at least partially corrected by remapping image pixels.

As a consequence of the fundamental way in which the display operates, the pseudo-curved display described in most embodiments hereinbefore is subject to a brightness limitation. In theory, if the brightness of the display device 1 combined with the entrance linear polariser 9 is 100%, then the brightness of the device as described in the first embodiment is only 25% due to the partial reflectors. Modification of the original image by software may be of use in order to help to compensate for this brightness issue.

A possible method of helping to correct for this type of brightness issue is by manipulating the original image data supplied to the display. A correction function, of linear or non-linear type according to the level of correction desired, may be applied to image data values of at least part of the image or sequence of images. For example, an image processing technique which adjusts the gamma values in the original image may be used to increase the apparent brightness of the pseudo-curved display. The gamma value describes the correspondence between the grey-level data in the image and the actual voltages applied to the display and hence the brightness that is ultimately displayed. Thus, for example by increasing the gamma values, the displayed brightness of the mid-grey levels may be increased whereas the fully black and/or fully white levels remain unchanged. An image processor may thus be used for manipulating grey levels of the image pixels. The overall effect results in an increase in the apparent brightness of the image. However, a possible disadvantage of such an apparent brightness increase is that a large correction may result in deterioration in the original image quality of the display.

Another solution to help to compensate for this brightness issue may be provided by hardware. Because of potential imaging issues such as the ones described hereinbefore, horizontal and/or vertical viewing angles of the curved-appearance display may be reduced in comparison with a standard display. Brightness increase methods may therefore take advantage of these viewing angle limitations. For example, brightness increase may be achieved by using collimated or semi-collimated illumination systems or by introducing a single brightness enhancing film (BEF) or crossed BEFs in the illumination system of the display device 1. Such BEFs are available from 3M, Kodak, General Electric and other Asian companies. This will redirect a large part of the off-axis light towards the on-axis direction, reducing brightness in the unnecessary horizontal and/or vertical viewing windows and therefore making the overall display look brighter when seen on-axis but dimmer when seen off-axis. The rest of the display may be operated in any of the ways described hereinbefore, with at least one of the reflective layers capable of having its shape being modified in order to generate the desired pseudo-curved appearance according to the application.

In the case of all embodiments of this invention, according to the application and in order to modify an existing flat panel display into a pseudo-curved display, optical components constituting the optical system of the pseudo-curved display may be fixed directly onto the display device 1 as part of its casing or may be arranged in a separate unit that acts as a removable attachment to the display. A removable attachment configuration presents many advantages, for instance its flexibility of use, its adaptability to different displays and the fact that it leaves the original display device 1 unmodified. However, in practice, one arrangement may be preferable to another according to the application.

A pseudo-curved display may be advantageously combined with a touch panel in order to give added interactive functionality. This may use a touch panel of any type, for example resistive or capacitive type, mounted on the front of the display system. Alternatively, it may be preferable to use a projected-capacitive type touch panel. As this type of touch panel detects the proximity of a finger and does not require direct contact, it may, if required, be mounted beneath some of the optical films used in the curved-appearance system or it may just use properties of at least one of the optical films already present in the system, for example a wire grid polariser or a patterned mirror.

By way of particular example, FIGS. 28a and 28b show a specific arrangement of a partial reflector whose shape is switchable. Such an arrangement may be used as the reflector 3 when switchable or as the reflector 5 as shown. The reflector 5 is actuated mechanically by means of automated pneumatic pumps (not shown). For improved clarity, only the reflective polariser 5 is shown; all other optical components necessary to achieve the pseudo-curved effect are assumed as built-in within the display device 40.

The reflective polariser 5 is maintained along its longitudinal direction by a top clamping frame 41 and a bottom clamping frame 42. These clamping frames 41 and 42 are specifically designed to secure the reflector 5 whilst being actuated. In addition, the reflective polariser 5 is fixed to the display device 40 on both its left and right hand sides by using a specifically designed central clamp 43 on each side. A pneumatic actuator 44 is located at each corner of the display device 40 and connected to either the top clamping frame 41 or the bottom clamping frame 42. Each pneumatic actuator 44 may be controlled separately or together by at least one external driving electronic system, which defines its position relative to the normal axis of the display device 40.

As illustrated in FIG. 28*a* when the pneumatic actuators are in position 0, the top clamping frame 41 and the bottom clamping frame 42 are in the same plane as the front surface of the central clamps 43. The reflective polariser 5 lays flat and parallel in front of the display device 40. The displayed image appears flat in its standard 2D-mode.

Switching to different shapes is based on the positions of the pneumatic actuators 44. As shown in FIG. 28*b* when all four pneumatic actuators 44 are in position 1, both top and bottom clamping frames 41 and 42 are pushed away from the display device 44. Top and Bottom edges of the reflective polariser 5 are therefore physically moved away from the display device 40 and end up very close to the front surface of the display 45. Whereas the central part of the reflector 5 stays close to the display device 40 due to the central clamps 43. The reflective polariser 5 describes a curved shape and a pseudo-curved image is observed.

Direct modification of the curvature of at least one of the reflective layers 3 and 5 via mechanical actuation may be achieved differently but still based on a similar principle. Depending on the desired curvature, the location of the clamping parts and the nature of the actuation mechanism, switching between different shapes is related to a controlled variation in position of at least part of at least one of the reflective layers 3 and 5.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. An optical system for varying the shape of a surface in which an image is perceived, the optical system comprising first and second spaced-apart partial reflectors, at least one of which is selectively switchable between a non-flat first shape and at least one second shape different from the first shape, and providing a doubly reflected light path, where light incident on the first reflector is first at least partially transmitted through the first reflector towards the second reflector, then at least partially reflected from the second reflector back towards the first reflector, then again at least partially reflected from the first reflector towards the second reflector, and finally at least partially transmitted through the second reflector.

2. A system as claimed in claim 1, in which the optical system is arranged substantially to prevent emission from the second reflector of light not reflected during reflection by the first and second reflectors, wherein light incident on the second partial reflector for the first time does not leave the optical system.

3. A system as claimed in claim 1, in which the second shape is flat.

4. A system as claimed in claim 1, in which the second shape is non-flat.

5. A system as claimed in claim 1, in which the at least one of the first and second reflectors which is selectively switchable comprises one of the first and second reflectors and the other of the first and second reflectors is of fixed shape.

6. A system as claimed in claim 5, in which the fixed shape is flat.

7. A system as claimed in claim 5, in which the fixed shape is non-flat.

8. A system as claimed in claim 1, in which the other of the first and second reflectors is selectively switchable between a non-flat third shape and a fourth shape different from the third shape.

9. A system as claimed in claim 8, in which the fourth shape is flat.

10. A system as claimed in claim 8, in which the fourth shape is non-flat.

11. A system as claimed in claim 8, in which the third shape is a mirror image of the first shape.

12. A system as claimed in claim 8, in which the fourth shape is a mirror image of the second shape.

13. A system as claimed in claim 1 in which the first and/or third shape is continuously curved in at least one direction for producing a concave or convex image.

14. A system as claimed in claim 1, in which the first and/or third shape comprises a plurality of flat segments, adjacent ones of which abut each other along an edge and subtend an angle greater than 0° and less than 180°.

15. A system as claimed in claim 1, in which the first and/or third shape has a serpentine cross-section.

16. A system as claimed in claim 1, in which the first and/or third shape is planar but tilted in at least one direction.

17. A system as claimed in claim 1, in which the first and/or third shape has flat and non-flat regions.

18. A system as claimed in claim 1, in which the first and/or third shape comprises a plurality of flat and/or non-flat regions which are non-coplanar.

19. A system as claimed in claim 1, in which the first and third shapes are of an at least similar shape and everywhere parallel to each other.

20. A system as claimed in claim 1, in which the optical system is arranged to change the polarisation of light during passage along the light path.

21. A system as claimed in claim 20, in which the optical system is arranged to change the polarisation of light during passage along the light path between incidence on the second reflector and reflection from the first reflector.

22. A system as claimed in claim 1, including a lens arrangement for at least partially correcting for image distortion.

23. A system as claimed in claim 1, comprising at least one quarter wave plate.

24. A system as claimed in claim 23, in which the quarter wave plate or a second of the quarter wave plates is disposed between the first and second reflectors.

25. A system as claimed in claim 23, in which the quarter wave plate or a first of the quarter wave plates is disposed on a side of the first reflector opposite the second reflector.

26. A system as claimed in claim 1, in which the first reflector comprises a first partial mirror.

27. A system as claimed in claim 26, in which the first partial mirror comprises a patterned mirror associated with an array of converging lenses.

28. A system as claimed in claim 26, in which the quarter wave plate or the second of the quarter wave plates and the patterned mirror form an integrated cell.

29. A system as claimed in claim 28, in which the quarter wave plate or the second of the quarter wave plates is patterned and has retarding portions disposed on reflector regions of the patterned mirror and non-retarding portions disposed on transparent regions of the patterned mirror.

30. A system as claimed in claim 1, in which the first reflector comprises a first reflective polariser.

31. A system as claimed in claim 1, in which the second reflector comprises a second reflective polariser.

32. A system as claimed in claim 31, in which the second reflective polariser comprises a cholesteric reflector.

33. A system as claimed in claims 31, in which the second reflective polariser is non-flat and in which the system comprises a first prism film arranged to redirect light from the first partial reflector to be incident substantially normally on the second reflective polariser.

34. A system as claimed in claim 33, comprising a second prism film arranged to redirect light from the second reflective polariser to the direction of light incident on the first prism film.

35. A system as claimed in claim 1, in which the second reflector comprises a second partial mirror.

36. A system as claimed in claim 1, comprising a Faraday rotator.

37. A system as claimed in claim 36, in which the Faraday rotator is arranged to provide 45° of polarisation rotation.

38. A system as claimed in claim 1, comprising an input linear polariser.

39. A system as claimed in claim 1, comprising an output linear polariser.

40. A display comprising: a display device for modulating light with an image or sequence of images at an image display surface of the device; and an optical system as claimed in claim 1, the first reflector being disposed between the device and the second reflector.

41. A display as claimed in claim 40, in which the device comprises one of a liquid crystal device, a projection display device, an organic light emitting diode device, a plasma light emitting device and a cathode ray tube.

42. A display as claimed in claim 40, comprising at least one of an instrument display, an advertising display, an immersive display, an amusement display and a television display.

43. A display as claimed in claim 40, comprising an image processor for remapping image pixels to correct at least partially for image distortion by the or each non-flat one of the first and second reflectors.

44. A display as claimed in claim 40, comprising an image processor for remapping colour channels of image pixels to correct at least partially for light exiting the optical system along an unintended light path.

45. A display as claimed in claim 40, comprising an image processor for manipulating grey levels of image pixels to increase at least partially the apparent brightness of at least part of the image.

46. A display as claimed in claim 40, in which the optical system comprises a removable attachment attached to the device.

47. A display as claimed in claim 40, including a touch panel.

* * * * *